US008615217B2

(12) United States Patent
Ravishankar et al.

(10) Patent No.: US 8,615,217 B2
(45) Date of Patent: Dec. 24, 2013

(54) METHODS, SYSTEMS, AND COMPUTER READABLE MEDIA FOR DETECTING AND MITIGATING FRAUD IN A DISTRIBUTED MONITORING SYSTEM THAT INCLUDES FIXED-LOCATION MONITORING DEVICES

(75) Inventors: Venkataramaiah Ravishankar, Cary, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 383 days.

(21) Appl. No.: 12/823,559

(22) Filed: Jun. 25, 2010

(65) Prior Publication Data
US 2011/0014939 A1    Jan. 20, 2011

Related U.S. Application Data

(60) Provisional application No. 61/220,557, filed on Jun. 25, 2009.

(51) Int. Cl.
*H04M 1/66* (2006.01)

(52) U.S. Cl.
USPC ........ 455/410; 455/403; 455/404.1; 455/405; 455/406; 455/407; 705/318; 705/14.47; 705/14.26; 340/853.1; 340/853.2; 340/870.01; 340/870.02; 340/870.03

(58) Field of Classification Search
USPC ............... 455/403–411, 418–420; 705/14.47, 705/14.26, 318; 340/853.1, 853.2, 340/870.01–870.03
See application file for complete search history.

(56) References Cited

U.S. PATENT DOCUMENTS

| | | | |
|---|---|---|---|
| 7,043,754 B2 | 5/2006 | Arnouse | |
| 8,045,956 B2 | 10/2011 | Sun et al. | |
| 2004/0140908 A1* | 7/2004 | Gladwin et al. | 340/870.02 |
| 2007/0174082 A1* | 7/2007 | Singh | 705/1 |
| 2008/0222038 A1 | 9/2008 | Eden | |
| 2009/0045251 A1 | 2/2009 | Jaiswal et al. | |
| 2009/0195349 A1* | 8/2009 | Frader-Thompson et al. | 340/3.1 |
| 2011/0029655 A1* | 2/2011 | Forbes et al. | 709/223 |
| 2011/0063126 A1* | 3/2011 | Kennedy et al. | 340/870.02 |

(Continued)

FOREIGN PATENT DOCUMENTS

EP    1 067 492 A2    1/2001

OTHER PUBLICATIONS

Non-Final Official Action for U.S. Appl. No. 13/047,287 (Jun. 6, 2012).

(Continued)

*Primary Examiner* — Fayyaz Alam

(74) *Attorney, Agent, or Firm* — Jenkins, Wilson, Taylor & Hunt, P.A.

(57) ABSTRACT

The subject matter described herein includes methods, systems, and computer readable media for detecting and mitigating fraud in a distributed monitoring system which includes fixed-location monitoring and communication devices. According to one aspect, a method for detecting and mitigating fraud includes receiving a signaling message that originates or appears to originate from a wireless communication device that is associated with a fixed-location management system that performs at least one of monitoring and control of a resource, wherein the wireless communication device is responsible for communicating information generated by the management system over a network. The method further includes determining whether the signaling message indicates an expected location of the wireless communication device and in response to a determination that the signaling message does not indicate an expected location of the wireless communication device, initiating a mitigating action.

18 Claims, 19 Drawing Sheets

(56) References Cited

U.S. PATENT DOCUMENTS

2011/0173122 A1 7/2011 Singhal
2011/0225091 A1 9/2011 Plastina et al.
2011/0307381 A1 12/2011 Kim et al.

OTHER PUBLICATIONS

Press Release, "SmartSynch SmartMeters Communicate Using the Larges and Most Available Wireless Networks in the World," http://www.smartsynch.com/SmartSynch_gprs.htm (Downloaded from the Internet Jul. 5, 2011).

"Solution: Itron Centron GPRS," Data Sheet, http://www.smartsynch.com/SmartSynch_itron_centron.htm (Downloaded from the Internet on Jul. 5, 2011).

Commonly-assigned, co-pending U.S. Appl. No. 13/047,287 (Unpublished, filed Mar. 14, 2011).

Press Release, "Echelon and T-Mobile Announce Alliance to Reduce the Cost of a Secure Smart Grid Network for Utilities," Echelon Corp., http://www. 3gamericas.org/index.cfm?fuseaction=pressrelease display& pressreleaseid= 2201, 3 pgs. (Apr. 23, 2009).

Myers, "SmartSynch Introduces Innovative 'DCX' Smart Grid Solution at DistribuTECH," SmartSynch News, http://www.appmesh.com/news/020309.htm Feb. 3, 2009 (Downloaded from the Internet on Jul. 5, 2011).

"NES System Architecture," Data Sheet, Copyright 2009 (Downloaded from the Internet on Jul. 5, 2011).

"Wireless M-Bus and ZigBee®-enabled GSM/GPRS/ EDG Gateway for Smart Metering Introduced," Metering.com, http://www.metering.com/node/13550 Sep. 19, 2008 (Downloaded from the Internet on Jul. 5, 2011).

Final Office Action for U.S. Appl. No. 13/047,287 (Jan. 31, 2013).

\* cited by examiner

| AUTHORIZED DEVICE ID (E.G., IMSI, MSISDN) | EXPECTED MSC_ID (E.G., ROUTING NUMBER) | EXPECTED LAI/LAC/PAGING AREA | EXPECTED CELL_ID | EXPECTED GEO-COORDS |
|---|---|---|---|---|
| 9193803814 | 9192000000 | LAI/LAC1 | CELL_ID1 | LAT1:LONG1 |
| 9194553252 | 9192000001 | LAI/LAC3 | CELL_ID7 | N/A |
| 9194605500 | 9192000002 | LAI/LAC2 | CELL_ID4 | N/A |

FIG. 2

| DESTINATION ID (E.G., SHORT CODE) | AUTHORIZED DEVICE ID (E.G., IMSI, MSISDN) | LAST UPDATE TIME | LAST UPDATE DATE | AUTHORIZED MESSAGE RATE (MSG PER HOUR) |
|---|---|---|---|---|
| 12000 | 9193803814 | 01:20:45 | 04/12/09 | 2 |
| 12959 | 9194553252 | 01:21:35 | 04/12/09 | 60 |
| 12000 | 919460 5500 | 01:25:12 | 04/12/09 | 15 |

# METHODS, SYSTEMS, AND COMPUTER READABLE MEDIA FOR DETECTING AND MITIGATING FRAUD IN A DISTRIBUTED MONITORING SYSTEM THAT INCLUDES FIXED-LOCATION MONITORING DEVICES

PRIORITY CLAIM

This application claims the benefit of U.S. Provisional Patent Application Ser. No. 61/220,557, filed Jun. 25, 2009; the disclosure of which is incorporated herein by reference in its entirety.

TECHNICAL FIELD

The subject matter described herein relates to detecting and mitigating fraudulent activities in a communications network. More particularly, the subject matter described herein relates to methods, systems, and computer readable media for detecting and mitigating fraud in a distributed monitoring system that includes fixed-location monitoring devices.

BACKGROUND

Remote management systems are currently being deployed in various environments. For example, utilities companies have started deploying smart meters (e.g., water, gas, and electric meters) that monitor resource usage and communicate with remote monitoring collection systems (e.g., wirelessly via a mobile network). Smart meters and other remote management devices typically allow a remote operator to control, monitor, or otherwise affect such devices and the managed resource or service. For example, many smart meters include functionality for disconnecting or interrupting service remotely.

Remote management can have significant advantages over on-site management. For example, remote management saves providers the expense of periodic trips to each physical location to gather information (e.g., by reading a meter). As such, billing can be based on near real-time consumption rather than on estimates based on previous or predicted consumption. Further, remote management can efficiently and quickly allow providers or operators to control and provision such devices, e.g., if a problem arises or if new service is requested. Thus, remote management may efficiently be utilized for billing, troubleshooting, analyzing, and planning purposes.

While using communications networks for remote management has some advantages over on-site management, problems can arise when one or more entities attempt fraudulent and/or malicious actions involving remote management functionality. For example, where smart meters use a communications network to communicate with a collection system in a smart grid environment, an attacker may spoof or clone valid meters in an attempt to affect service, billing, and/or the underlying communications network. In the above example, an attack involving the monitored service may intentionally or inadvertently overload or flood the communications network with messages, such as during a denial of service (DoS) attack. If the communications network is flooded, additional services (e.g., calls) and users (e.g., mobile phone subscribers) of the communications network may be affected. Thus, to prevent service blackouts and/or communications network failures, it is important to safeguard such networks and services from fraudulent and/or malicious activity.

Accordingly, there exists a need for methods, systems, and computer readable media for detecting and mitigating fraud in a distributed monitoring system that includes fixed-location monitoring devices.

SUMMARY

The subject matter described herein includes methods, systems, and computer readable media for detecting and mitigating fraud in a distributed monitoring system that includes fixed-location monitoring devices. As used herein, fraud includes one or more actions that are unwanted or harmful to an entity.

According to one aspect, the subject matter described herein includes a method for detecting and mitigating fraud in a distributed monitoring system which includes fixed-location monitoring and communication devices. The method includes receiving a signaling message that originates or appears to originate from a wireless communication device that is associated with a fixed-location management system that performs at least one of monitoring and control of a resource, wherein the wireless communication device is responsible for communicating information generated by the management system over a network. The method further includes determining whether the signaling message indicates an expected location of the wireless communication device and in response to a determination that the signaling message does not indicate an expected location of the wireless communication device, initiating a mitigating action.

According to another aspect, the subject matter described herein includes a method for detecting and mitigating fraud in a distributed monitoring system which includes fixed-location monitoring and communication devices. The method includes receiving a signaling message that originates or appears to originate from a wireless communication device that is associated with a fixed-location management system that performs at least one of monitoring and control of a resource, wherein the wireless communication device is responsible for communicating information generated by the management system over a network. The method further includes querying a network element to obtain location information for the wireless communication device. The method also includes receiving, in response to the query, location information for the wireless communication device. The method further includes determining, based on the location information, whether the signaling message indicates an expected location of the wireless communication device, and in response to a determination that the signaling message does not indicate an expected location of the wireless communication device, initiating a mitigating action.

According to yet another aspect, the subject matter described herein includes a method for detecting and mitigating fraud in a distributed monitoring system which includes fixed-location monitoring and communication devices. The method includes receiving a signaling message that originates or appears to originate from a wireless communication device that is associated with a fixed-location management system that performs at least one of monitoring and control of a resource, wherein the wireless communication device is responsible for communicating information generated by the management system over a network. The method further includes determining whether a rate of the signaling message traffic has exceeded a predetermined relationship with respect to a message transmission threshold for the wireless communication device, and in response to a determination that the rate of the signaling message traffic has exceeded the predetermined relationship with respect to the threshold, initiating a mitigating action.

According to yet another aspect, the subject matter described herein includes a method for detecting and mitigating fraud in a distributed monitoring system which includes fixed-location monitoring and communication devices. The method includes receiving a signaling message that originates or appears to originate from a wireless communication device that is associated with a fixed-location management system that performs at least one of monitoring and control of a resource, wherein the wireless communication device is responsible for communicating information generated by the management system over a network. The method further includes determining whether a rate of the signaling message traffic has exceeded a predetermined relationship with respect to a message transmission threshold for the communication device. The method also includes in response to a determination that the rate of the signaling message traffic has exceeded the predetermined relationship with respect to the threshold, determining, from the signaling message traffic, whether the signaling message traffic indicates an expected location of the wireless communication device, and in response to a determination that the signaling message traffic does not indicate an expected location of the wireless communication device, initiating a mitigating action.

According to another aspect, the subject matter described herein includes a system for detecting and mitigating fraud in a distributed monitoring system that includes fixed-location monitoring devices. The system includes a network node for receiving a signaling message that originates or appears to originate from a wireless communication device that is associated with a fixed location management system that monitors usage of a resource, wherein the wireless communication device is responsible for communicating usage information generated by the management system over a network. The system also includes a fraud detection module operatively associated with the network node for determining whether the signaling message indicates an expected location of the wireless communication device, and, in response to a determination that the signaling message does not indicate an expected location of the wireless communication device, initiating a mitigating action.

The subject matter described herein for detecting and mitigating fraud in a distributed monitoring system that includes fixed-location monitoring devices may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, e.g., disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 2 is a diagram illustrating an exemplary table for storing location information usable by a fraud detection module according to an embodiment of subject matter described herein;

FIG. 14 is a diagram illustrating an exemplary table for storing message rate threshold information usable by a fraud detection module according to an embodiment of subject matter described herein;

DETAILED DESCRIPTION

The subject matter described herein includes methods, systems, and computer readable media for detecting and mitigating fraud in a distributed monitoring system that includes fixed-location monitoring devices. According to one aspect of the present subject matter described herein, a fraud detection module (FDM) may receive, request, gather, and/or retain knowledge of fixed-locations associated with certain devices and may use this knowledge to detect and/or mitigate fraudulent or malicious activities.

It will be appreciated that residential utility smart meters and other distributed monitoring and/or management applications or devices may be deployed at fixed locations (e.g., geographically or physically fixed where the location does not change over time). For example, wireless management and/or monitoring systems (e.g., smart meters) currently in use and designs being contemplated may utilize wireless communications networks to transmit and receive data from a fixed location. Other exemplary applications or devices may include, but are not limited to, premises monitoring applications, vending machine monitoring, bank ATM monitoring, retail sales kiosk monitoring, oil or water well level monitoring, environmental monitoring, weather station monitoring, agricultural monitoring, compliance monitoring, quality control monitoring, fixed-position navigation marker monitoring.

Figure 1:
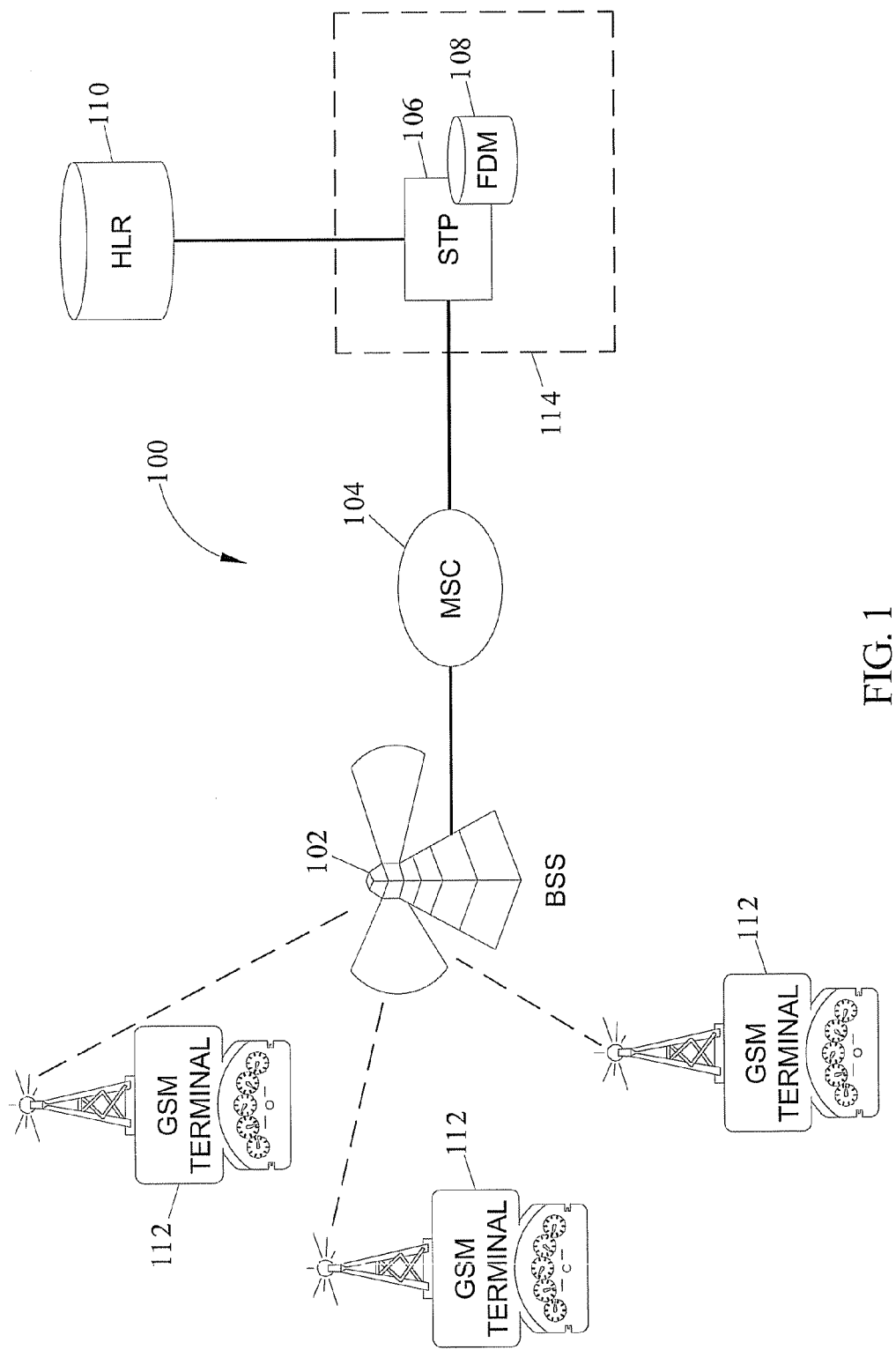
FIG. 1 is a network diagram illustrating an exemplary GSM network that includes a fraud detection module according to an embodiment of the subject matter described herein.

FIG. 1 is a network diagram illustrating an exemplary GSM network that includes a fraud detection module according to an embodiment of the subject matter described herein. Referring to FIG. 1, GSM network 100 includes a base station system (BSS) 102, a mobile switching center (MSC) 104, a signaling transfer point (STP) 106, a FDM 108, a home location register (HLR) 110, and wireless network-enabled monitoring devices 112.

BSS 102 is the functional entity that is responsible for handling traffic and signaling between a mobile or wireless terminal (e.g., phones, computers, monitoring devices 112, etc.) and the network switching subsystem. BSS 102 carries out transcoding of speech channels, allocation of radio channels to mobile terminals, paging, transmission, and reception over the air interface and many other tasks related to the radio network. For example, BSS 102 may receive and transmit signals to mobile terminals, e.g., phones, computers, and other wireless network-enabled devices. BSS 102 may also include functionality for communicating with other nodes within one or more communications networks. In FIG. 1, BSS 102 communicates with MSC 104. For example, BSS 102 may send signaling messages originating from one or more wireless network-enabled terminals to MSC 104 for routing messages to a destination.

MSC 104 is the functional entity that represents an automatic packet switching system within a wireless communication network. When such a packet switching system is implemented so as to serve as the interface for user traffic between the cellular network and other public switched networks, the corresponding node is often referred to as a Gateway MSC or GMSC. In general, MSC 104 may provide basic switching functionality and coordinates the establishment of calls between wireless end users. MSC 104 may be responsible for transmission facilities management, mobility management, and call processing functions. MSC 104 may communicate with the air-interface components of a wireless network (e.g., BSS 102) as well as with other voice and signaling related nodes in the wireless network. As such, MSC 104 may incorporate switching functions, mobile application functions, and other service logic functions in a wireless communications network.

Home location register (HLR) 110 is the functional entity that represents the primary database repository of terminal information used to provide control and intelligence in wireless communication networks. The term register denotes control and processing center functions as well as the database functions. HLR 110 may be managed by the wireless service provider and represents the "home" database for terminals (herein also referred to as subscribers) subscribed to service in a particular geographic area. HLR 110 may contain a record for each "home" subscriber that includes location information, subscriber status, subscribed features, and directory numbers. Supplementary services or features that are provided to a subscriber may also ultimately be controlled HLR 110. HLR 110 may typically incorporate database functions, mobile application functions, as well as other service logic functions, and may service one or more MSCs 104.

FDM 108 represents functionality for detecting fraudulent and/or malicious activity (e.g., actions initiated by fraudulent or cloned communication terminals in the network 100). In one embodiment, FDM 108 may include functionality for screening and/or analyzing signaling messages (e.g., signaling system number 7 (SS7) messages or session initiation protocol (SIP) messages). For example, FDM 108 may be deployed in a network for screening messages that originates or appears to originate from a fixed-location smart meter with wireless connectivity functionality. In one embodiment, FDM 108 may be a stand-alone element (e.g., as a security or fraud detection node). In a second embodiment, FDM 108 may be functionality in one or more network elements.

FDM 108 may be accessible by, integrated with, co-located with, or operatively associated with a network element. Exemplary network elements may include a network routing element, a signaling system number 7 (SS7) signal transfer point (STP), an Internet protocol (IP) node, a SS7-IP signaling gateway, a session initiation protocol (SIP) node, a DIAMETER node, a WiMAX node, a base station, an long term evolution (LTE) node, a global system for mobile communications (GSM) node, a IS-41 node, a mobility management service element, a home location register (HLR), a visitor location register (VLR), a home subscriber server (HSS), or a user profile server function (UPSF), a SIP registrar, SIP location server, a call session control function (CSCF), a SIP proxy, a DIAMETER server, an AAA server, a foreign agent node, an application services network (ASN) gateway, and an external probe.

In one embodiment, FDM 108 may be operatively associated with a wireless communications network routing element, such as an SS7 signal transfer point (STP), an Internet protocol (IP) node, a SS7-IP signaling gateway, session initiation protocol (SIP) router, DIAMETER router, etc. In FIG. 1, FDM 108 is operatively associated with STP 106. In one embodiment, FDM 108 and STP 106 (and/or other associated nodes) may be referred to as a fraud detection system (FDS) 114. In second embodiment, FDM 108 may be operatively associated with a mobility management service element in a wireless communication network, such as a GSM or IS41 home location register (HLR), visitor location register (VLR) or an IP multimedia subsystem (IMS) HSS, a SIP registrar or location server, an IMS CSCF, a SIP proxy, DIAMETER server, AAA server, etc.

FDM 108 may manage or maintain location information for fixed-location management and/or monitoring devices. In one embodiment, FDM 108 may learn an "expected" or "home" location of a mobile communication device associated with a fixed-location management and/or monitoring devices. For example, FDM 108 may learn the expected location of such a mobile communication device by receiving and analyzing mobility management messages, e.g., MAP UpdateLocation, MAP UpdateLocationArea, MAP ProvideSubscriberInformation, MAP ProvideSubscriberLocation. Mobility management messages may include sufficient information to identify a wireless communication device (e.g., IMSI, MSISDN, URI, IP address) and the device's expected location. In a second embodiment, expected location information may be provisioned or provided for use by FDM 108, such as by a network operator or resource provider. For example, an electric company may provide expected location information to a FDM database after site installation and service activation of a smart meter.

Location information may be stored in database or data structure that is accessible by or integrated with FDM 108. Location information may include a variety of information for determining location. For example, location information may include identifiers associated with network components, such as MSC and VLR identifiers, location area identification (LAI), Location Area Code (LAC), cell identification numbers. Additionally, location information may include geographical or physical positioning information, such global positioning system (GPS) coordinates, latitude and longitude coordinates, and other positioning information associated with a management and/or monitoring device 112.

Devices 112 represent fixed-location management systems with networking functionality for communicating with remote locations (e.g., smart meters). Devices 112 may perform at least one of monitoring and control of a resource or service. For example, smart meters may be part of a smart grid connected together via a communications network for allowing intelligent monitoring and provisioning of one or more resources. In this example, smart meters may report to one or more smart grid controllers and controllers may also communicate with the smart meters.

In one embodiment, devices 112 may include GSM transceiver terminals or other wireless communications functionality. For example, wireless communications devices may be integrated with or communicatively coupled to a fixed-location management and/or monitoring system for facilitating communication via the GSM network 100. Devices 112 may use such wireless communication connectivity for remote monitoring and/or provisioning applications. In one embodiment, devices 112 may be configured for transmitting monitoring data to a monitoring data collection system. Devices 112 may also be configured for receiving instructions from a provisioning system that is accessible via the GSM network.

In embodiments where devices 112 may be associated with transmit-only terminals or receive-only terminals, devices 112 may be deployed for half-duplex interaction with a remote collection system, e.g., a "report-only" or "control-only" type application.

Devices 112 may communicate with the collection and/or provisioning systems (e.g., a smart grid controller) using one or more data transport protocols. Exemplary data transport protocols may include protocols for carry text messages or other payload types. In one embodiment, devices 112 may send monitoring and/or management information using message service messages (e.g., SMS or MMS), IM messages, SIP messages (e.g., SIP INFO or SIP MESSAGE), or an unstructured supplementary data service (USSD) message. In such an embodiment, FDM 108 may receive or intercept a signaling message that is carrying a text message (e.g., SMS message, MMS message, USSD message, SIP MESSAGE or INFO message, etc.) to a collection and/or provision system, and in response to detection of this message, FDM 108 may initiate processing to confirm that the sending mobile communication device has not moved from its expected location.

FIG. 2 is a diagram illustrating an exemplary table for storing location information according to an embodiment of subject matter described herein. In FIG. 2, a table 200 depicts exemplary data that may be accessed and/or stored by an FDM module in a GSM network-based embodiment. Table 200 includes an authorized device ID field, which may include mobile network subscriber or device identifiers, such as an International Mobile Station Identifier (IMSI), a Mobile Subscriber ISDN (MSISDN) identifier, and a Mobile Identification Number (MIN). In one embodiment, authorized devices may be determined by resource or service providers (e.g., an electric company or wireless network operator) and may include one or more fixed-location wireless communication devices (e.g., fixed-location smart meters).

Table 200 may also include additional fields for storing location information. In one embodiment, one or more authorized device ID values may be associated with an expected serving MSC identifier or a serving VLR identifier. Exemplary MSC or VLR identifiers may include a GSM network routing number, an entity address identifier, an SS7 point code address, an Internet protocol (IP) address, a uniform resource identifier (URI). One or more authorized device ID values may also be associated with other expected location information. For example, a device ID value may be associated with values of a location area identifier (LAI), a location area code (LAC), a paging area, and/or a cell ID. In one embodiment, expected geo-location coordinate information, such as global positioning system (GPS) coordinates, latitude and longitude coordinates, or other positional coordinates may also be associated with one or more authorized device ID values.

It will be appreciated that the information stored, accessed, or used by an FDM may vary depending on the communications network, configuration, and detection policies used. For example, an FMD deployed in other networks (e.g., SIP, IMS, WiMAX, DIAMETER, etc.) may store, access, or use different and/or additional information from that shown in FIG. 2. In a particular example, an exemplary table for use by an FDM in a DIAMETER-based network may include user agent client (UAC) identifiers, such as a SIP uniform resource identifier (URI), Instant Message Service address, or an IP address. UAC identifiers may be associated with SIP server information which identifies the SIP server (e.g., SIP proxy, P-CSCF, etc.) to which the embedded UAC is being assigned.

Figure 3:
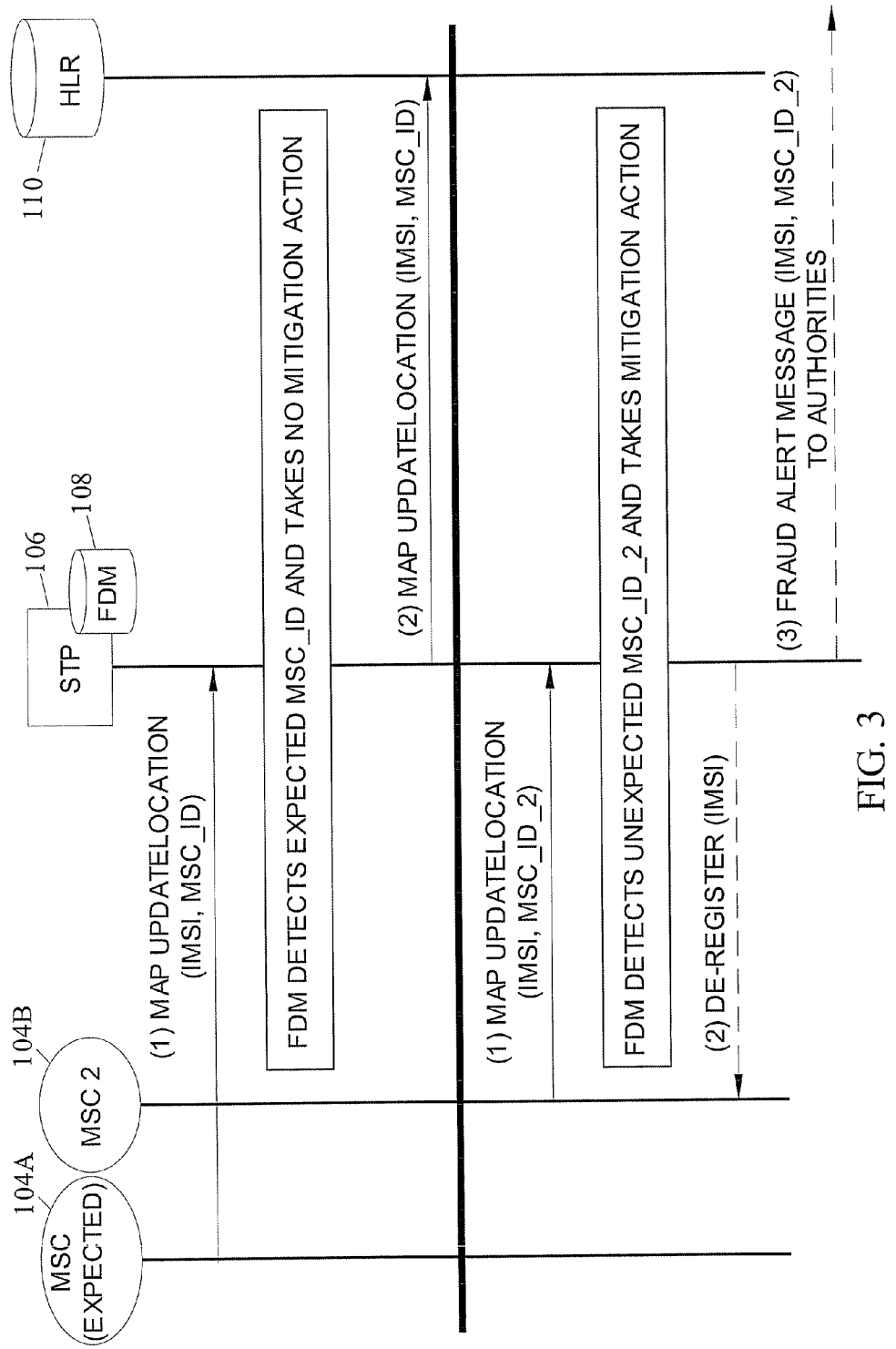
FIG. 3 is a message flow diagram illustrating screening of mobility management messages by a fraud detection module according to an embodiment of subject matter described herein.

FIG. 3 is a message flow diagram illustrating screening of mobility management messages by a fraud detection module according to an embodiment of subject matter described herein. In the embodiment illustrated in FIG. 3, a GSM-based network (e.g., GSM 100) is depicted where FDM 108 is operatively associated with STP 106. In FIG. 3, two transactions are shown involving two MSCs 104. Each transaction includes a different MSC 104 initiating a mobility management message (e.g., a MAP UpdateLocation message) for the same or apparently the same communications device that is screened by FDM 108. FDM 108 is configured to detect movement (e.g., unexpected or unauthorized movement) of the fixed-location communications device from a predetermined or learned expected location associated with the device.

As shown in the top transaction (located above the bold line) of FIG. 3, in step 1, a MSC 104A associated with a communications device communicatively coupled to a fixed-location management system (e.g., a device 112) may launch a MAP UpdateLocation message (or other MAP message) associated with the device. The MAP UpdateLocation message, which provides location information regarding the communications device, includes a device ID parameter, and a serving MSC ID parameter. The UpdateLocation message is transmitted to STP 106. FDM 108 associated with STP 106 may receive or intercept the UpdateLocation message. FDM 108 may retrieve the device ID (represented by "IMSI") and the serving MSC ID (represented by "MSC_ID") values contained in the UpdateLocation message. In one example, the MSC ID value may be contained in the signaling connection control part (SCCP) calling party (CgPA) parameter of an SCCP/MAP or SCCP user adaptation (SUA)/MAP message. After retrieving the parameters from the messages, FDM 108 compares the device ID and serving MSC ID values found in the message to corresponding authorized or expected values (e.g., such values may be stored in a table accessible by FDM 108, such as Table 200 of FIG. 2). In one embodiment, all screened message parameters must match up with (e.g., have equal or similar values as) their corresponding expected values or mitigation actions will be initiated. In a second embodiment, a more lenient screening policy may be implemented. In the top transaction, FDM 108 determines that the retrieved message parameters match up with the corresponding expected values and, as such, performs no mitigation action. In particular, FDM 108 determines that the UpdateLocation message is from the authorized or expected MSC 104A. In step 2 of the top transaction, STP 106 forwards the message towards HLR 110.

As shown in the bottom transaction of FIG. 3, in step 1, a MSC 2 104B launches a MAP UpdateLocation message associated with or appearing to be associated with the communications device communicatively coupled to a fixed-location management system of the top transaction. The MAP UpdateLocation message, which provides location information regarding the communications device, includes a device ID parameter, and a serving MSC ID parameter. The UpdateLocation message is transmitted to STP 106. FDM 108 associated with STP 106 may receive or intercept the UpdateLocation message. FDM 108 may retrieve the device ID (represented by "IMSI") and the serving MSC ID (represented by "MSC_ID_2") values contained in the UpdateLocation message. After retrieving the parameters from the messages, FDM 108 compares the device ID and serving MSC ID values found in the message to corresponding authorized values (e.g., values found in Table 200 of FIG. 2). In one embodiment, all screened message parameters must match up with (e.g., have equal or similar values as) their corresponding expected values or mitigation actions will be initiated. In a second embodiment, a more lenient screening policy may be implemented. In the bottom transaction of FIG. 3, FDM 108 determines that MSC 2 104B is not an authorized or expected MSC 104 associated with the communications device as identified by the device ID value contained in the UpdateLocation message. In response to a determination that the signaling message does not indicate an expected location of the communications device, FDM 108 or an associated node (e.g., STP 106) initiates or performs one or more mitigation actions. Mitigation actions may include, but are not limited to, blocking, rejecting, or discarding the message, logging the event in an event log, generating an alert or notification message associated with the event and transmitting the alert message to an authority or operator, initiating a deregistration of the communications device, and blacklisting the mobile device so that the device is not permitted to reregister in the network. For example, in step 2 of the bottom transaction, STP 106 send a deregister message to MSC 2 104B and sends a fraud alert message containing one or more identifying parameters (e.g., the device ID and serving MSC ID values) to one or more authorities (e.g., police, a security module, a central office, a reporting function, wireless network operators, and operators, and service or resource provider).

Figure 4:
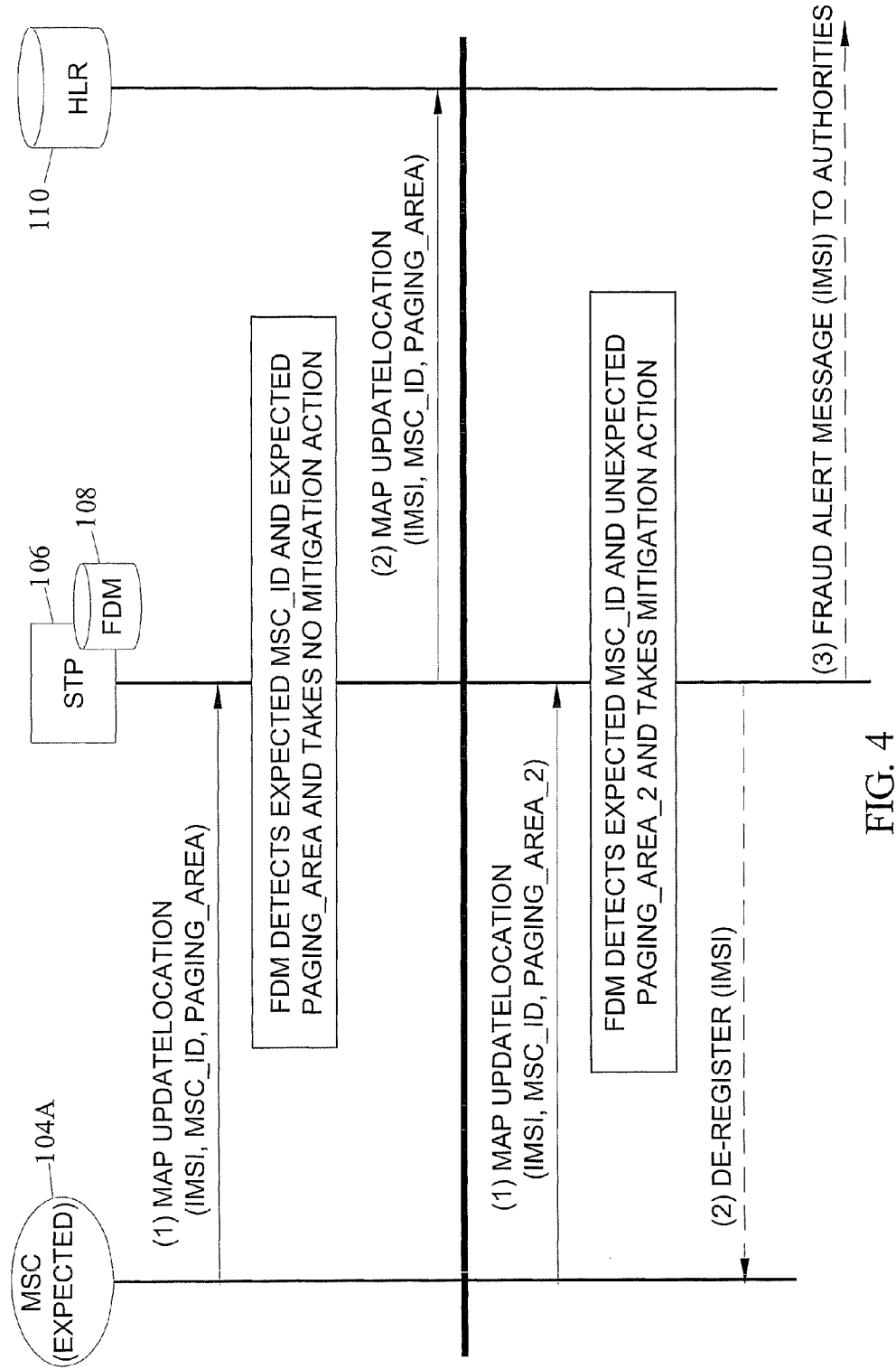
FIG. 4 is a message flow diagram illustrating screening of mobility management messages by a fraud detection module according to another embodiment of subject matter described herein.

FIG. 4 is a message flow diagram illustrating screening of mobility management messages by a fraud detection module according to another embodiment of subject matter described herein. In the embodiment illustrated in FIG. 4, a GSM-based network (e.g., GSM 100) is depicted where FDM 108 is operatively associated with STP 106. In FIG. 4, two transactions are shown. Each transaction includes MSC 104A initiating a mobility management message (represented by a MAP UpdateLocation message) for the same or apparently the same communications device that is screened by FDM 108. FDM 108 is configured to detect movement (e.g., unexpected or unauthorized movement) of the fixed-location communications device from a predetermined or learned expected location associated with the device.

As shown in the top transaction (located above the bold line) of FIG. 4, in step 1, a MSC 104A associated with a communications device communicatively coupled to a fixed-location management system (e.g., a device 112) may launch a MAP UpdateLocation message (or other MAP message) associated with the device. The MAP UpdateLocation message, which provides location information regarding the communications device, includes a device ID parameter value, a serving MSC ID parameter value, and a paging area parameter value. The UpdateLocation message is transmitted to STP 106. FDM 108 associated with STP 106 may receive or intercept the UpdateLocation message. FDM 108 retrieves device ID (represented by "IMSI"), serving MSC ID (represented by "MSC_ID"), and paging area (represented by "PAGING_AREA") values contained in the UpdateLocation message. After retrieving the parameters from the messages, FDM 108 compares the device ID, serving MSC ID, and paging area values with corresponding authorized or expected values. In one embodiment, all screened message parameters must match up with (e.g., have equal or similar values as) their corresponding expected values or mitigation actions will be initiated. In a second embodiment, a more lenient screening policy may be implemented. In the top transaction, FDM 108 determines that the retrieved message parameters match up with the corresponding expected values and, as such, performs no mitigation action. In particular, FDM 108 determines that the UpdateLocation message contains parameter values associated with expected MSC 104A and an expected paging area. In step 2 of the top transaction, STP 106 forwards the message towards HLR 110.

As shown in the bottom transaction of FIG. 4, in step 1, MSC 104A may launch a MAP UpdateLocation message associated with or appearing to be associated with the communications device communicatively coupled to a fixed-location management system of the top transaction. The MAP UpdateLocation message, which provides location information regarding the communications device, includes a device ID parameter value, a serving MSC ID parameter value, and a paging area parameter value. The UpdateLocation message is transmitted to STP 106. FDM 108 associated with STP 106 may receive or intercept the UpdateLocation message. FDM 108 may retrieve the device ID (represented by "IMSI"), serving MSC ID (represented by "MSC_ID"), and paging area (represented by "PAGING_AREA_2") values contained in the UpdateLocation message. After retrieving the parameters from the messages, FDM 108 compares the device ID, serving MSC ID, and paging area values with corresponding expected values. In one embodiment, all screened message parameters must match up with (e.g., have equal or similar values as) their corresponding expected values or mitigation actions will be initiated. In a second embodiment, a more lenient screening policy may be implemented. In the bottom transaction of FIG. 4, FDM 108 determines that MSC ID parameter value matches an expected MSC ID, but that the paging area parameter value does not match an expected paging area. In response to a determination that the signaling message does not indicate an expected location of the communications device, FDM 108 or an associated node (e.g., STP 106) initiates or performs one or more mitigation actions. In step 2 of the bottom transaction, STP 106 send a deregister message to MSC 104A and sends a fraud alert message containing one or more identifying parameters (e.g., the device ID and serving MSC ID values) to one or more authorities.

Figure 5:
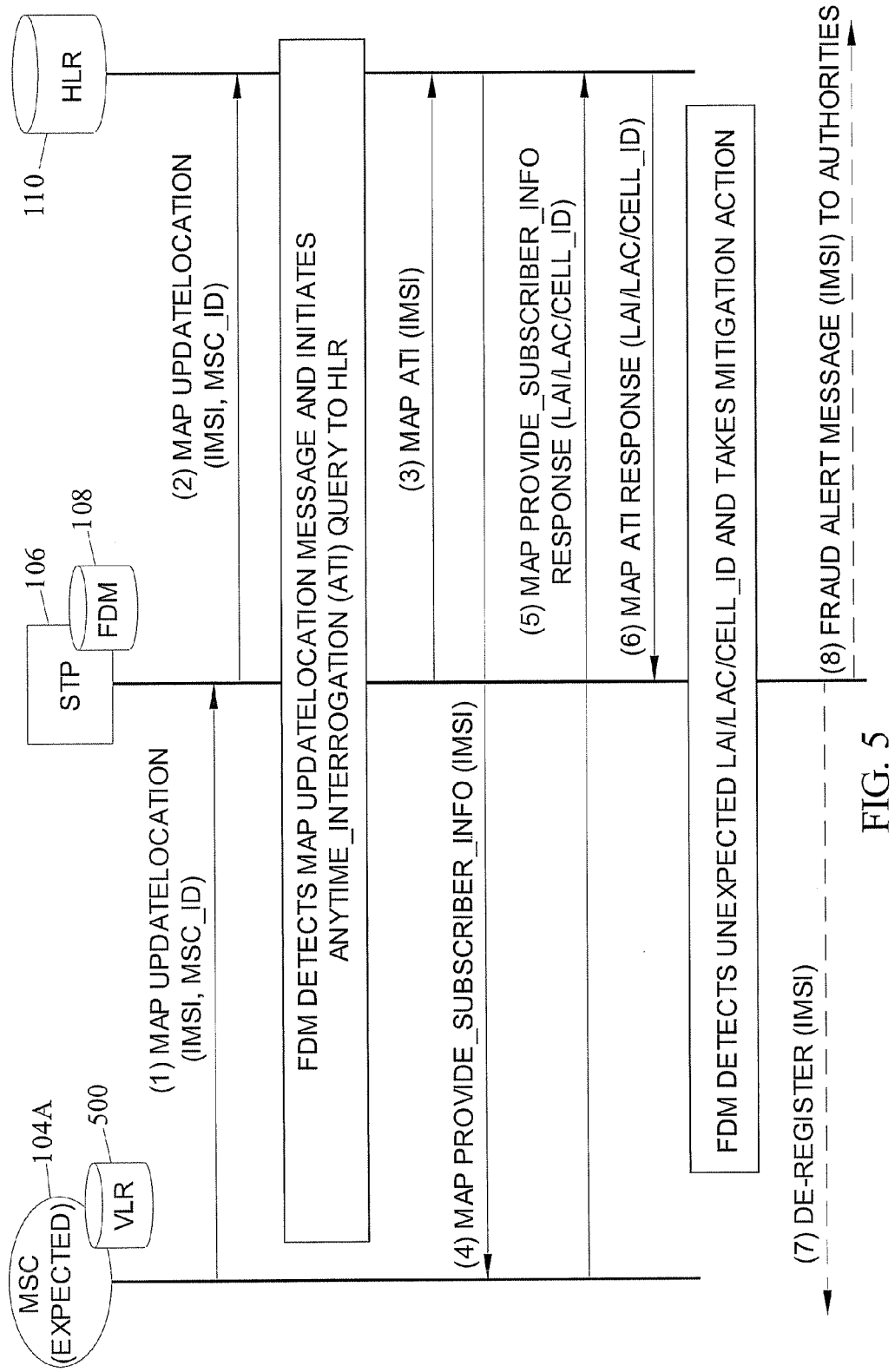
FIG. 5 is a message flow diagram illustrating screening of mobility management messages and querying of a home location register (HLR) by a fraud detection module according to an embodiment of subject matter described herein.

FIG. 5 is a message flow diagram illustrating screening of mobility management messages and querying of a home location register (HLR) by a fraud detection module according to an embodiment of subject matter described herein. In the embodiment illustrated in FIG. 5, a GSM-based network (e.g., GSM 100) is depicted where FDM 108 is operatively associated with STP 106.

In step 1, a MSC 104A associated with a communications device communicatively coupled to a fixed-location management system (e.g., a device 112) may launch a MAP UpdateLocation message (or other MAP message) associated with the device. The MAP UpdateLocation message, which provides location information regarding the communications device, may include a device ID parameter value (represented by "IMSI") and a serving MSC ID parameter value (represented by "MSC_ID"). The UpdateLocation message may be transmitted to STP 106. FDM 108 associated with STP 106 may receive or intercept the UpdateLocation message. FDM 108 may retrieve the device ID value contained in the UpdateLocation message. FDM 108 may use the device ID value in determining whether the device should be screened based on location information (e.g., whether the device is a wireless communication device that is associated with a fixed-location management system). For example, FDM 108 may use device ID as a lookup value in a table accessible by or stored at FDM 108 (e.g., Table 200 of FIG. 2). In step 2, in response to a determination that the communications device is not a device for screening by FDM 108 (e.g., no entry found matching the device ID value in FDM table), STP 106 may send the UpdateLocation message towards HLR 110.

In response to a determination that the communications device is a device for screening by FDM 108, FDM 108 may generate and initiate a MAP AnytimeInterrogation (ATI) query message towards HLR 110 requesting current location information for the subscriber. In step 3, FDM 106 (or STP 106) may send the ATI query message to HLR 110. In step 4, HLR 110 may send a MAP ProvideSubscriberInformation message to VLR 500 requesting current location information for the subscriber. In step 5, VLR 500 may send a response message with location information (e.g., LAI, LAC, and/or cell identifier information) to HLR 110. In step 6, HLR 110 may send a response message with current location information for the subscriber to STP 106 (and/or FDM 108). FDM 106 may compare the subscriber location information received from HLR 110 with the expected subscriber location information stored at FDM 106. If the location information does not match, a mitigation action may be triggered. For example, in step 7, STP 106 may send a deregister message to MSC 104A and, in step 8, STP 106 may send a fraud alert message containing one or more identifying parameters (e.g., the device ID) to one or more authorities.

Figure 6:
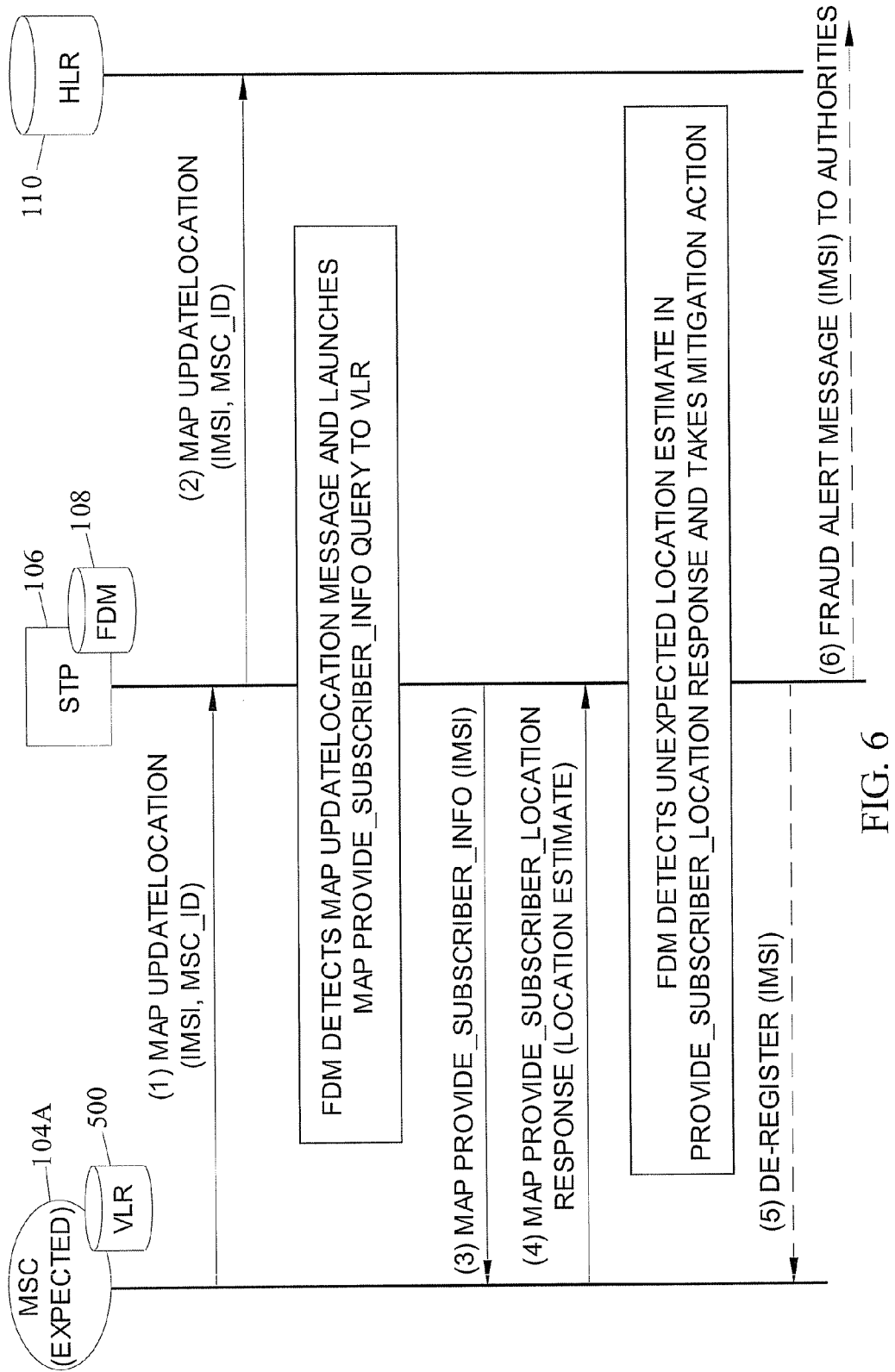
FIG. 6 is a message flow diagram illustrating screening of mobility management messages and querying of a visitor location register (VLR) by a fraud detection module according to an embodiment of subject matter described herein.

FIG. 6 is a message flow diagram illustrating screening of mobility management messages and querying of a visitor location register (VLR) by a fraud detection module according to an embodiment of subject matter described herein. In the embodiment illustrated in FIG. 6, a GSM-based network (e.g., GSM 100) is depicted where FDM 108 is operatively associated with STP 106.

In step 1, a MSC 104A associated with a communications device communicatively coupled to a fixed-location management system (e.g., a device 112) may launch a MAP UpdateLocation message (or other MAP message) associated with the device. The MAP UpdateLocation message, which provides location information regarding the communications device, may include a device ID parameter value (represented by "IMSI") and a serving MSC ID parameter value (represented by "MSC_ID"). The UpdateLocation message may be transmitted to STP 106. FDM 108 associated with STP 106 may receive or intercept the UpdateLocation message. FDM 108 may retrieve the device ID value contained in the UpdateLocation message. FDM 108 may use the device ID value in determining whether the device should be screened based on location information (e.g., whether the device is a wireless communication device that is associated with a fixed-location management system). For example, FDM 108 may use device ID as a lookup value in a table accessible by or stored at FDM 108 (e.g., Table 200 of FIG. 2). In step 2, in response to a determination that the communications device is not a device for screening by FDM 108 (e.g., no entry found matching the device ID value in FDM table), STP 106 may send the UpdateLocation message towards HLR 110.

In response to a determination that the communications device is a device for screening by FDM 108, FDM 108 may generate and initiate a MAP ProvideSubscriberLocation query for requesting current location estimate information for the subscriber. In step 3, FDM 106 (or STP 106) may send the message towards the serving MSC 104A (and/or VLR 500) to HLR 110. In step 4, VLR 500 may send a response message with location information to STP 106 (and/or FDM 108). FDM 106 may compare the subscriber location information received from VLR 500 with the expected subscriber location information stored at FDM 106. If the location information does not match, a mitigation action may be triggered. For example, in step 5, STP 106 may send a deregister message to MSC 104A and, in step 6, STP 106 may send a fraud alert message containing one or more identifying parameters (e.g., the device ID) to one or more authorities.

Figure 7:
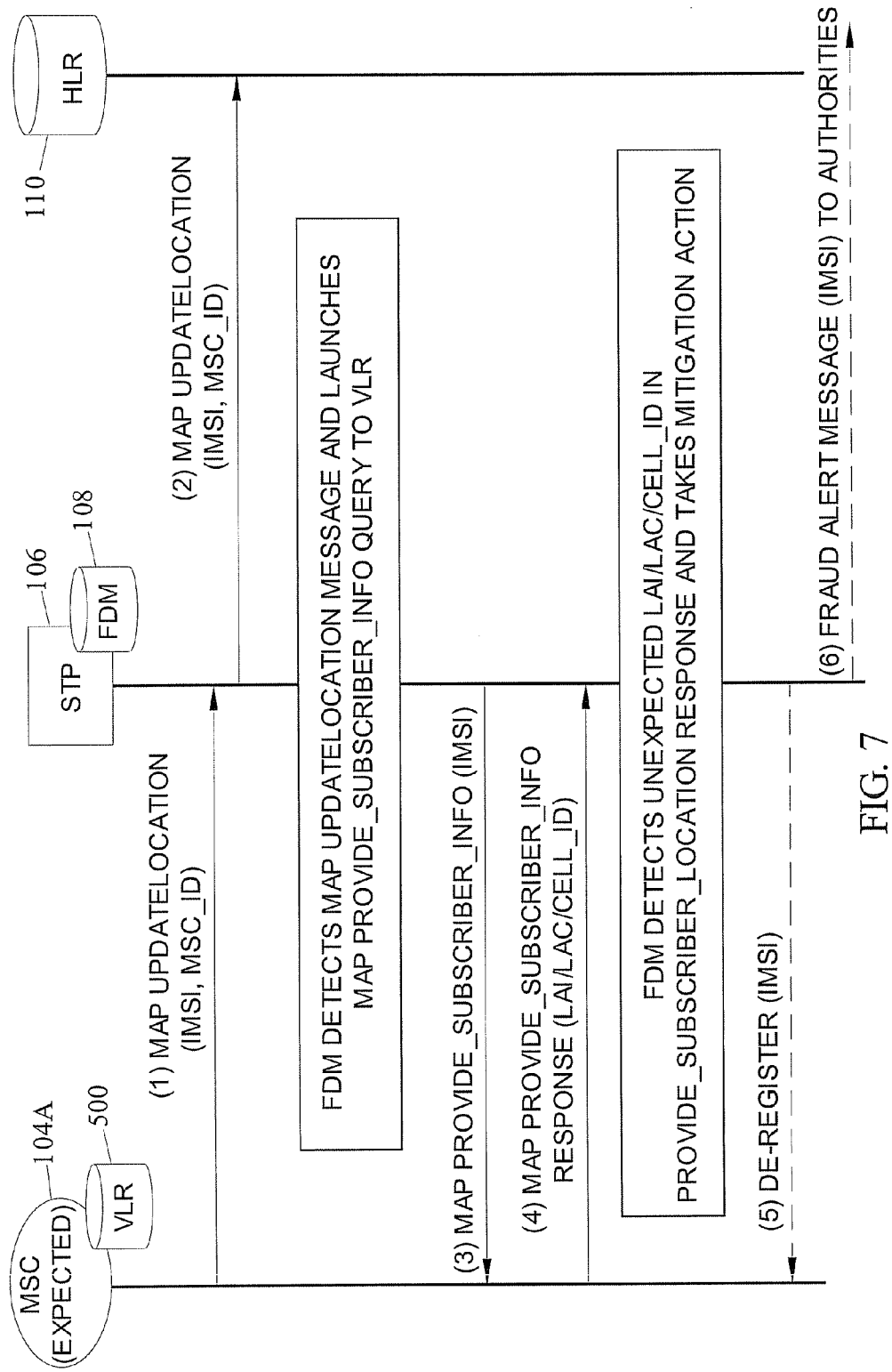
FIG. 7 is a message flow diagram illustrating screening of mobility management messages and querying of a visitor location register (VLR) by a fraud detection module according to another embodiment of subject matter described herein.

FIG. 7 is a message flow diagram illustrating screening of mobility management messages and querying of a visitor location register (VLR) by a fraud detection module according to another embodiment of subject matter described herein. In the embodiment illustrated in FIG. 7, a GSM-based network (e.g., GSM 100) is depicted where FDM 108 is operatively associated with STP 106.

In step 1, a MSC 104A associated with a communications device communicatively coupled to a fixed-location management system (e.g., a device 112) may launch a MAP UpdateLocation message (or other MAP message) associated with the device. The MAP UpdateLocation message, which provides location information regarding the communications device, may include a device ID parameter value (represented by "IMSI") and a serving MSC ID parameter value (represented by "MSC_ID"). The UpdateLocation message may be transmitted to STP 106. FDM 108 associated with STP 106 may receive or intercept the UpdateLocation message. FDM 108 may retrieve the device ID value contained in the UpdateLocation message. FDM 108 may use the device ID value in determining whether the device should be screened based on location information (e.g., whether the device is a wireless communication device that is associated with a fixed-location management system). For example, FDM 108 may use device ID as a lookup value in a table accessible by or stored at FDM 108 (e.g., Table 200 of FIG. 2). In step 2, in response to a determination that the communications device is not a device for screening by FDM 108 (e.g., no entry found matching the device ID value in FDM table), STP 106 may send the UpdateLocation message towards HLR 110.

In response to a determination that the communications device is a device for screening by FDM 108, FDM 108 may generate and initiate a MAP ProvideSubscriberLocation query for requesting current location estimate information for the subscriber. In step 3, FDM 106 (or STP 106) may send the message towards the serving MSC 104A (and/or VLR 500) to HLR 110. In step 4, VLR 500 may send a response message with location information (e.g., LAI, LAC, and/or cell identifier information) to STP 106 (and/or FDM 108). FDM 106 may compare the subscriber location information received from VLR 500 with the expected subscriber location information stored at FDM 106. If the location information does not match, a mitigation action may be triggered. For example, in step 5, STP 106 may send a deregister message to MSC 104A and, in step 6, STP 106 may send a fraud alert message containing one or more identifying parameters (e.g., the device ID) to one or more authorities.

Figure 8:
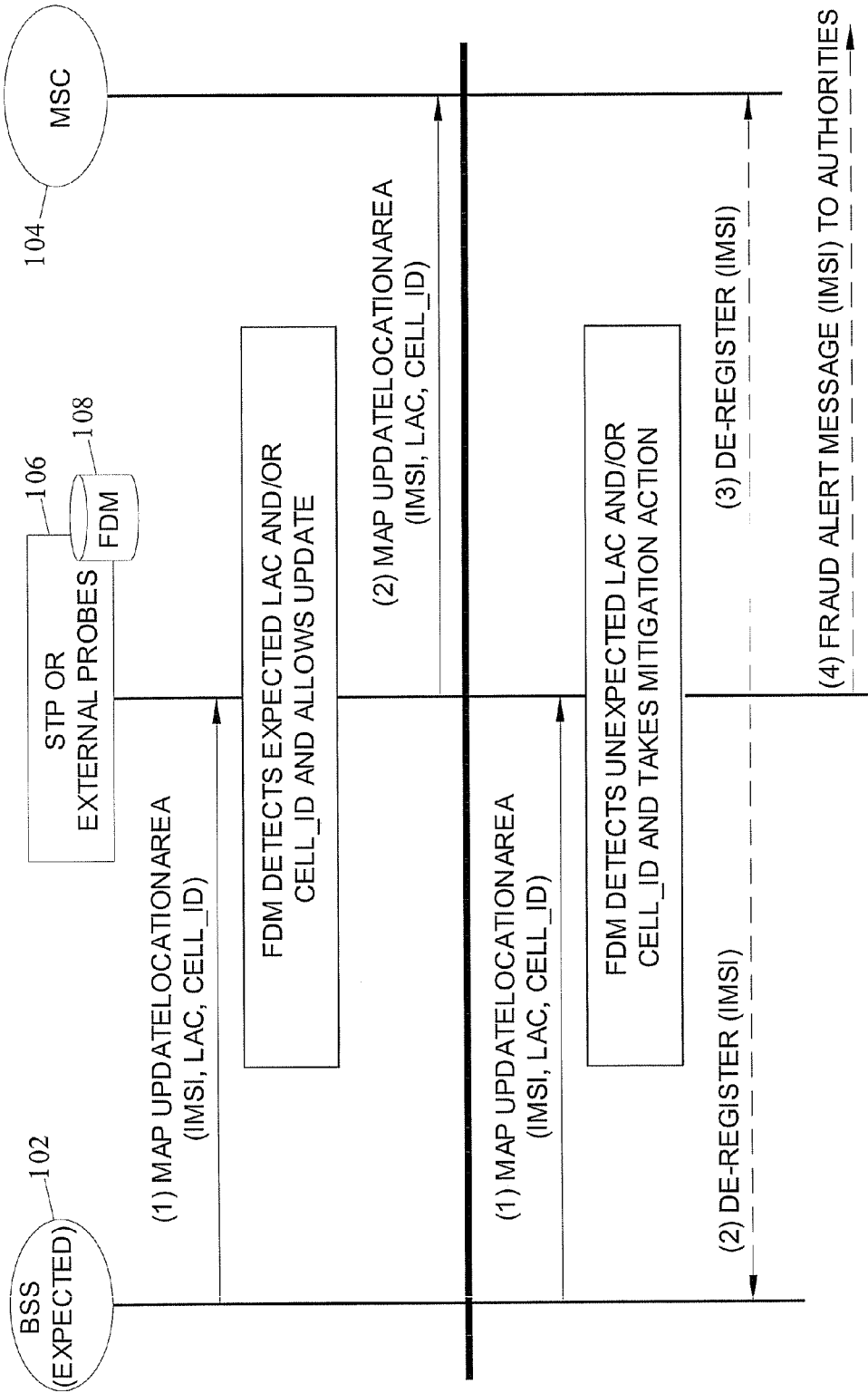
FIG. 8 is a message flow diagram illustrating screening of mobility management messages on the A-interface between a base station subsystem (BSS) and a mobile switching center (MSC) by a fraud detection module according to another embodiment of subject matter described herein.

FIG. 8 is a message flow diagram illustrating screening of mobility management messages on the A-interface between a base station subsystem (BSS) and a mobile switching center (MSC) by a fraud detection module according to another embodiment of subject matter described herein. In the embodiment illustrated in FIG. 8, a GSM-based network (e.g., GSM 100) is depicted where FDM 108 is operatively associated with STP 106 or external probes for screening messages sent via an A-interface. In FIG. 8, two transactions are shown.

As shown in the top transaction (located above the bold line) of FIG. 8, in step 1, a BSS 102 associated with a communications device communicatively coupled to a fixed-location management system (e.g., a device 112) may launch a MAP UpdateLocationArea message (or other MAP message) associated with the device. The MAP UpdateLocationArea message, which provides location information regarding the communications device, includes a device ID parameter value (represented by "IMSI"), a location area code parameter value (represented by "LAC"), and a cell identification number (represented by "Cell_ID"). The UpdateLocationArea message is transmitted to STP 106. FDM 108 associated with STP 106 may receive or intercept the UpdateLocationArea message. FDM 108 may retrieve the device ID value contained in the UpdateLocationArea message. FDM 108 may use the device ID value in determining whether the device should be screened based on location information (e.g., whether the device is a wireless communication device that is associated with a fixed-location management system). For example, FDM 108 may use device ID as a lookup value in a table accessible by or stored at FDM 108 (e.g., Table 200 of FIG. 2). In response to a determination that the communications device is not a device for screening by FDM 108 (e.g., no entry found matching the device ID value in FDM table), STP 106 may send the UpdateLocationArea message towards MSC 104.

In response to a determination that the communications device is a device for screening by FDM 108, FDM 108 may retrieve additional parameters (e.g., LAC, LAI, and/or Cell ID information) contained in the UpdateLocationArea message. FDM 108 may compare this subscriber location information with the expected subscriber location information stored at FDM 106. If the location information matches, the UpdateLocationArea message may continue towards a destination. For example, in step 2, STP 106 may send the UpdateLocationArea message towards MSC 104.

If the location information does not match, one or more mitigation actions may be triggered. As shown in the bottom transaction of FIG. 8, if FDM 108 determines that location parameters of the UpdateLocationArea message do not match the expected location information, FDM 108 may initiate sending a deregister message to BSS 102 and MSC 104. Further, FDM 108 may initiate sending a fraud alert message containing one or more identifying parameters (e.g., the device ID) to one or more authorities.

It will be appreciated that, while FIGS. 1-8 deal primarily with a GSM network, the present subject matter disclosed herein is not limited to GSM cellular implementations. In particular, the present subject matter disclosed herein is applicable to various types of communications networks and various network implementations. For example, a FDM may be deployed in a general packet radio service (GPRS)-based network, a SIP-based network, an SS7 network, an IP Multimedia Subsystem (IMS) network, a WiMAX network, a DIAMETER-based network, LTE-based network, or a future network. In one embodiment, an FDM may be configured to use different types of signaling messages and/or location information (depending on the network) for detecting and mitigating fraud in a distributed monitoring system which includes fixed-location monitoring and communication devices. For example, FDM may screen a signaling message in an LTE-based network that originates or appears to originate from a wireless communication device that is associated with a fixed-location management system that performs at least one of monitoring and control of a resource. FDM may use location information associated with LTE-based protocols in determining whether a wireless communication device that is associated with a fixed-location management system that performs at least one of monitoring and control of a resource is in an expected location. Further aspects and embodiments of the present subject matter described herein are below, including embodiments for fraud detection involving non-SS7, non-MAP networks.

Figure 9:
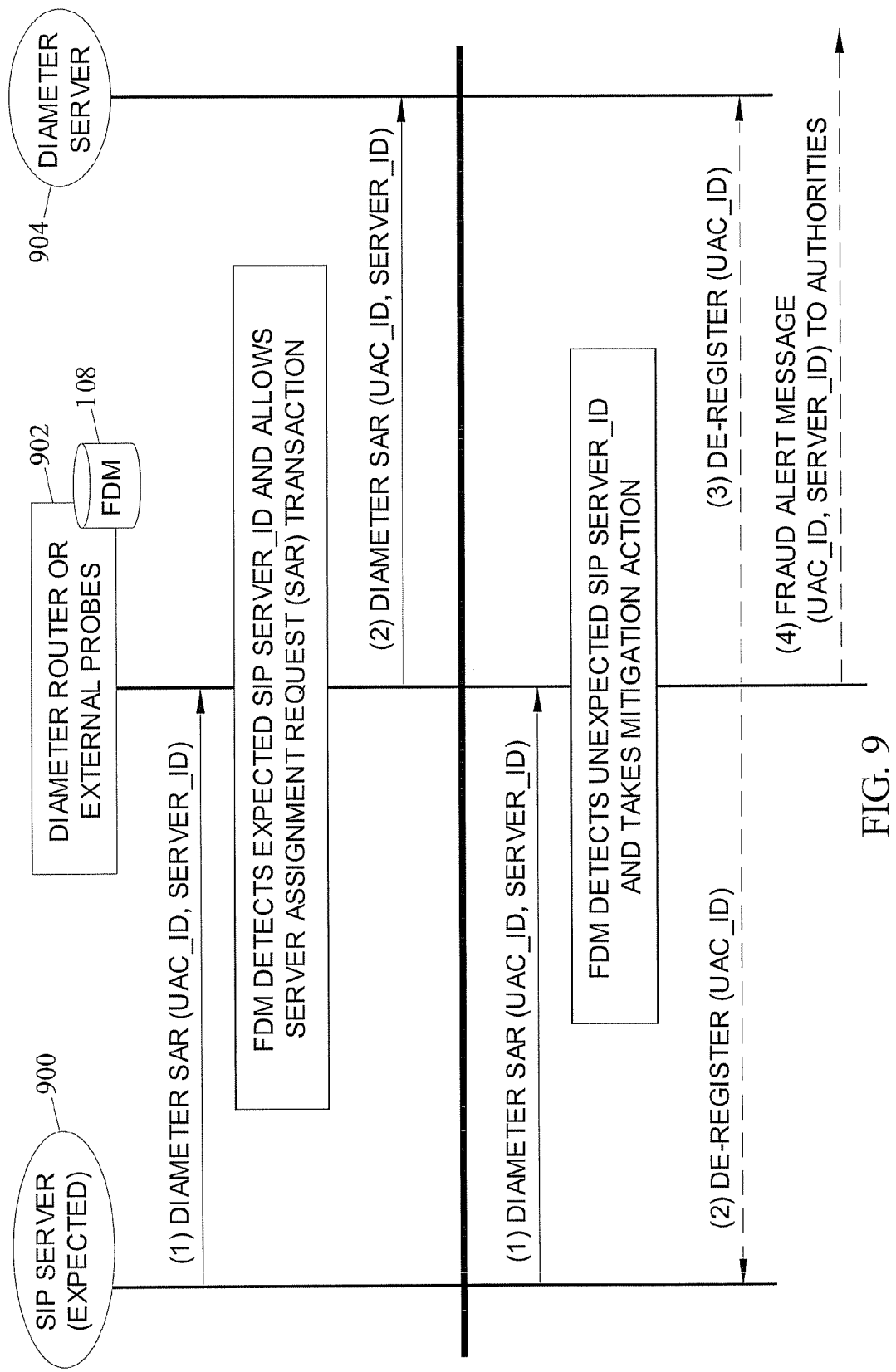
FIG. 9 is a message flow diagram illustrating screening of mobility management messages by a fraud detection module in a DIAMETER-based network according to an embodiment of subject matter described herein.

FIG. 9 is a message flow diagram illustrating screening of mobility management messages by a fraud detection module in a DIAMETER-based network according to an embodiment of subject matter described herein. In the embodiment illustrated in FIG. 9, a SIP-based network (e.g., an IMS network) is depicted where FDM 108 is operatively associated with a DIAMETER router 902 or external probes for screening messages sent between SIP server 900 and DIAMETER server 904. In one embodiment, the DIAMETER signaling protocol may be used to communicate, among other things, mobility management/location information between nodes and endpoints in the SIP-based network. In this embodiment, SIP server 900 may include or be operatively associated a DIAMETER client for communicating using the DIAMETER signaling protocol.

As shown in the top transaction (located above the bold line) of FIG. 9, in step 1, SIP server 900 associated with a communications device communicatively coupled to a fixed-location management system (e.g., a device 112) may generate and launch a DIAMETER Server Assignment Request (SAR) request message associated with the device to or towards DIAMETER server 904. The DIAMETER SAR message may include information which identifies an embedded UAC, such as a SIP uniform resource identifier (URI) or an IP address. The SAR may also include information which identifies a SIP server (e.g., SIP proxy, P-CSCF, etc.) to which the embedded UAC is being assigned. FDM 108 associated with DIAMETER router 902 or external probes may receive or intercept the SAR message. FDM 108 may retrieve the UAC ID value contained in the SAR message. FDM 108 may use the UAC ID value in determining whether the device should be screened based on location information (e.g., whether the device is a wireless communication device that is associated with a fixed-location management system). For example, FDM 108 may use UAC ID as a lookup value in a table accessible by or stored at FDM 108 (e.g., a table similar to Table 200 of FIG. 2). In response to a determination that the communications device is not a device for screening by FDM 108 (e.g., no entry found in FDM table), DIAMETER router 902 may send the SAR message towards DIAMETER server 904.

In response to a determination that the communications device is a device for screening by FDM 108, FDM 108 may retrieve additional parameters, such as Server ID information, contained in the SAR message. FDM 108 may compare this subscriber location information with corresponding expected subscriber location information stored at FDM 106. For example, FDM 108 may compare server information retrieved from the SAR message to an expected SIP server value. If the location information matches, the SAR message may continue towards a destination. For example, in step 2, DIAMETER router 902 may send the SAR message towards DIAMETER server 904.

If the location information does not match, one or more mitigation actions may be triggered. As shown in the bottom transaction of FIG. 9, if FDM 108 determines that the location parameters of a SAR message do not match the expected location information, FDM 108 may initiate sending a deregister message to SIP server 900 and DIAMETER 904. Further, FDM 108 may initiate sending a fraud alert message containing one or more identifying parameters (e.g., the UAC ID) to one or more authorities.

Figure 10:
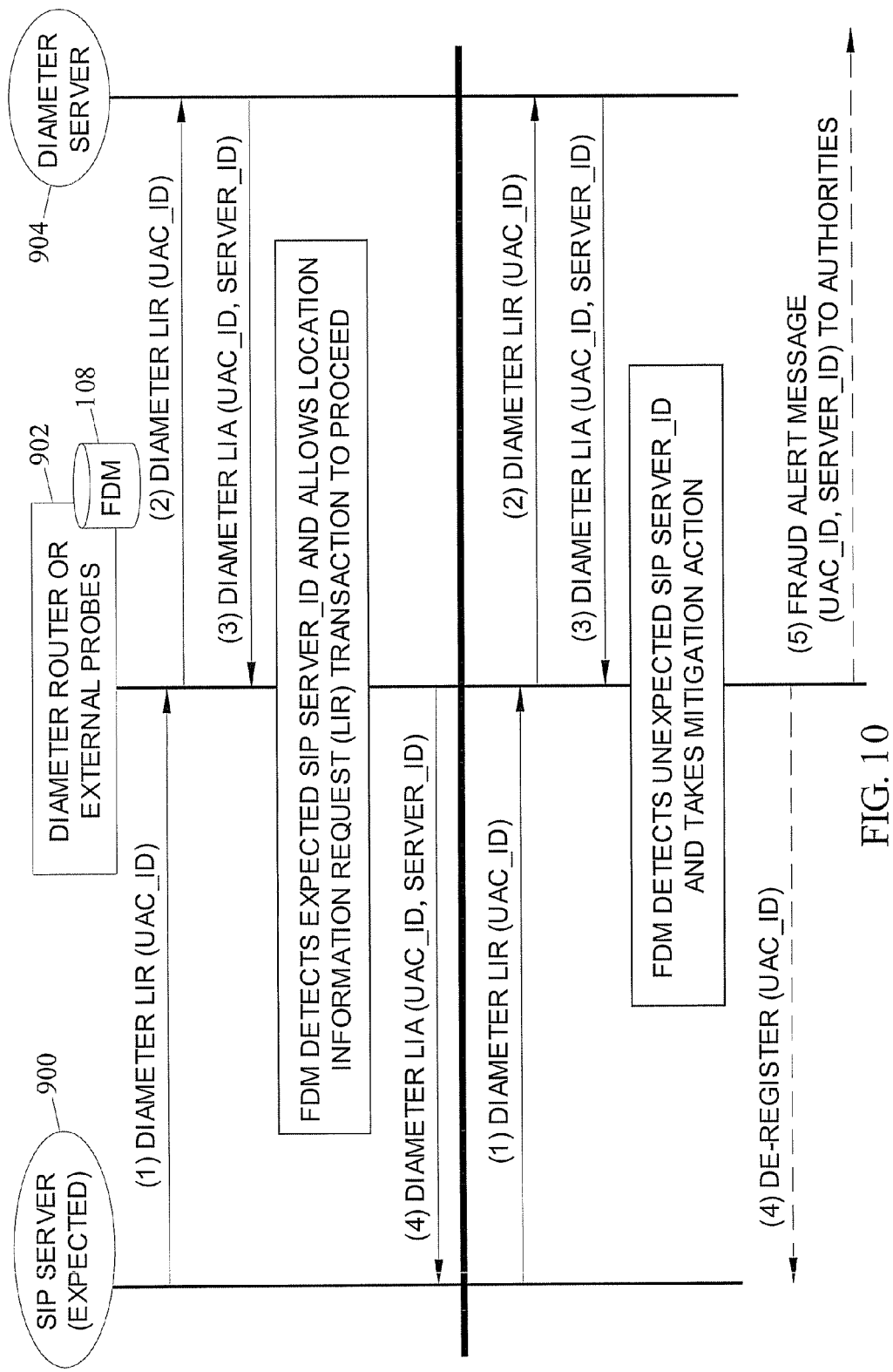
FIG. 10 is a message flow diagram illustrating screening of mobility management messages by a fraud detection module in a DIAMETER-based network according to another embodiment of subject matter described herein.

FIG. 10 is a message flow diagram illustrating screening of mobility management messages by a fraud detection module in a DIAMETER-based network according to another embodiment of subject matter described herein. In the embodiment illustrated in FIG. 10, a SIP-based network (e.g., an IMS network) is depicted where FDM 108 is operatively associated with a DIAMETER router 902 or external probes for screening messages sent between SIP server 900 and DIAMETER server 904. In one embodiment, the DIAMETER signaling protocol may be used to communicate, among other things, mobility management and/or location information between nodes and endpoints in the SIP-based network. In this embodiment, SIP server 900 may include or be operatively associated a DIAMETER client for communicating using the DIAMETER signaling protocol.

As shown in the top transaction (located above the bold line) of FIG. 10, in steps 1, SIP server 900 associated with a communications device communicatively coupled to a fixed-location management system (e.g., a device 112) may generate and launch a DIAMETER Location Information Request (LIR) request message associated with the device to or towards DIAMETER server 904. The DIAMETER LIR message may include information which identifies an embedded UAC, such as a SIP uniform resource identifier (URI) or an IP address. In step 2, DIAMETER router 902 may forward the LIR message towards DIAMETER server 904. In step 3, a Location Information Answer (LIA) response message, provided by DIAMETER server 904 may include the UAC identifier and information which identifies the SIP server (e.g., SIP proxy, P-CSCF, etc.) to which the embedded UAC is being assigned. FDM 108 associated with DIAMETER router 902 or external probes may receive or intercept the SAR message. FDM 108 may retrieve the UAC ID value contained in the LIA message. FDM 108 may use the UAC ID value in determining whether the device should be screened based on location information (e.g., whether the device is a wireless communication device that is associated with a fixed-location management system). For example, FDM 108 may use UAC ID as a lookup value in a table accessible by or stored at FDM 108 (e.g., a table similar to Table 200 of FIG. 2). In response to a determination that the communications device is not a device for screening by FDM 108 (e.g., no entry found in FDM table), DIAMETER router 902 may send the LIA message towards SIP server 900.

In response to a determination that the communications device is a device for screening by FDM 108, FDM 108 may retrieve additional parameters, such as Server ID information, contained in the SAR message. FDM 108 may compare this subscriber location information with corresponding expected subscriber location information stored at FDM 106. For example, FDM 108 may compare server information retrieved from the LIA message to an expected SIP server value. If the location information matches, the LIA message may continue towards a destination. For example, in step 2, DIAMETER router 902 may send the LIA message towards SIP server 900.

If the location information does not match, one or more mitigation actions may be triggered. As shown in the bottom transaction of FIG. 10, if FDM 108 determines that the location information (e.g., server ID information) in the LIA message does not match the expected location information (e.g., expected server ID information), FDM 108 may initiate sending a deregister message to SIP server 900. Further, FDM 108 may initiate sending a fraud alert message containing one or more identifying parameters (e.g., the UAC ID and Server ID) to one or more authorities.

Figure 11:
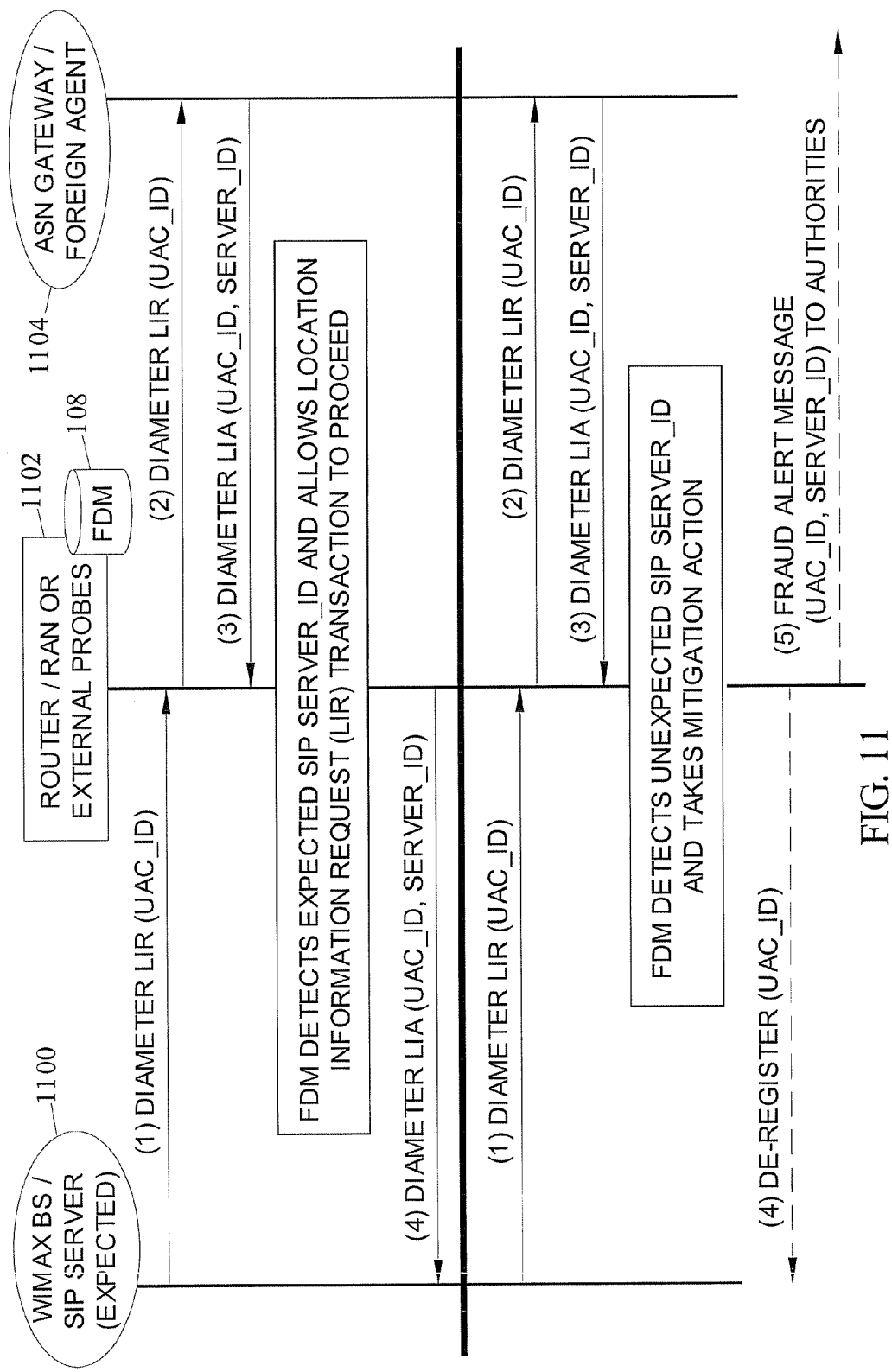
FIG. 11 is a message flow diagram illustrating screening of mobility management messages by a fraud detection module in a worldwide interoperability for microwave access (WiMAX) network according to an embodiment of subject matter described herein.

FIG. 11 is a message flow diagram illustrating screening of mobility management messages by a fraud detection module in a WiMAX network according to an embodiment of subject matter described herein. In the embodiment illustrated in FIG. 11, a SIP-based network (e.g., an IMS network) is depicted where FDM 108 is operatively associated with a router 1102 in a radio access network (RAN) or external probes for screening messages sent between WiMAX base station 1100 and application services network (ASN) gateway 1104 or foreign agent. In one embodiment, the DIAMETER signaling protocol may be used to communicate, among other things, mobility management and/or location information between nodes and endpoints in the SIP-based network. In this embodiment, WiMAX base station 1100 may include or be operatively associated with SIP server functionality and a DIAMETER client for communicating using the DIAMETER signaling protocol.

As shown in the top transaction (located above the bold line) of FIG. 11, in steps 1, WiMAX base station 1100 associated with a communications device communicatively coupled to a fixed-location management system (e.g., a device 112) may generate and launch a DIAMETER Location Information Request (LIR) request message associated with the device to or towards ASN gateway 1104. The DIAMETER LIR message may include information which identifies an embedded UAC, such as a SIP uniform resource identifier (URI) or an IP address. In step 2, router 1102 may forward the LIR message towards ASN gateway 1104. In step 3, a Location Information Answer (LIA) response message, provided by ASN gateway 1104 may include the UAC identifier and information which identifies the SIP server (e.g., SIP proxy, P-CSCF, etc.) to which the embedded UAC is being assigned. FDM 108 associated with router 1102 or external probes may receive or intercept the SAR message. FDM 108 may retrieve the UAC ID value contained in the LIA message. FDM 108 may use the UAC ID value in determining whether the device should be screened based on location information (e.g., whether the device is a wireless communication device that is associated with a fixed-location management system). For example, FDM 108 may use UAC ID as a lookup value in a table accessible by or stored at FDM 108 (e.g., a table similar to Table 200 of FIG. 2). In response to a determination that the communications device is not a device for screening by FDM 108 (e.g., no entry found in FDM table), router 1102 may send the LIA message towards WiMAX base station 1100.

In response to a determination that the communications device is a device for screening by FDM 108, FDM 108 may retrieve additional parameters, such as Server ID information, contained in the SAR message. FDM 108 may compare this subscriber location information with corresponding expected subscriber location information stored at FDM 106. For example, FDM 108 may compare server information retrieved from the LIA message to an expected SIP server value. If the location information matches, the LIA message may continue towards a destination. For example, in step 2, router 1102 may send the SAR message towards WiMAX base station 1100.

If the location information does not match, one or more mitigation actions may be triggered. As shown in the bottom transaction of FIG. 11, if FDM 108 determines that the location information (e.g., server ID information) in the LIA message does not match the expected location information (e.g., expected server ID information), FDM 108 may initiate sending a deregister message to WiMAX base station 1100. Further, FDM 108 may initiate sending a fraud alert message containing one or more identifying parameters (e.g., the UAC ID and Server ID) to one or more authorities.

Reference will now be made to various embodiments and aspects of the present subject matter described herein for screening additional messages types, e.g., MMS, SMS, USSD, IM, and SIP messages. In one embodiment, such messages may be used to send payload information, such as monitoring or management information associated with a fixed location management system to a collection and/or provisioning system (e.g., a residential smart meter in a smart grid environment).

Figure 12:
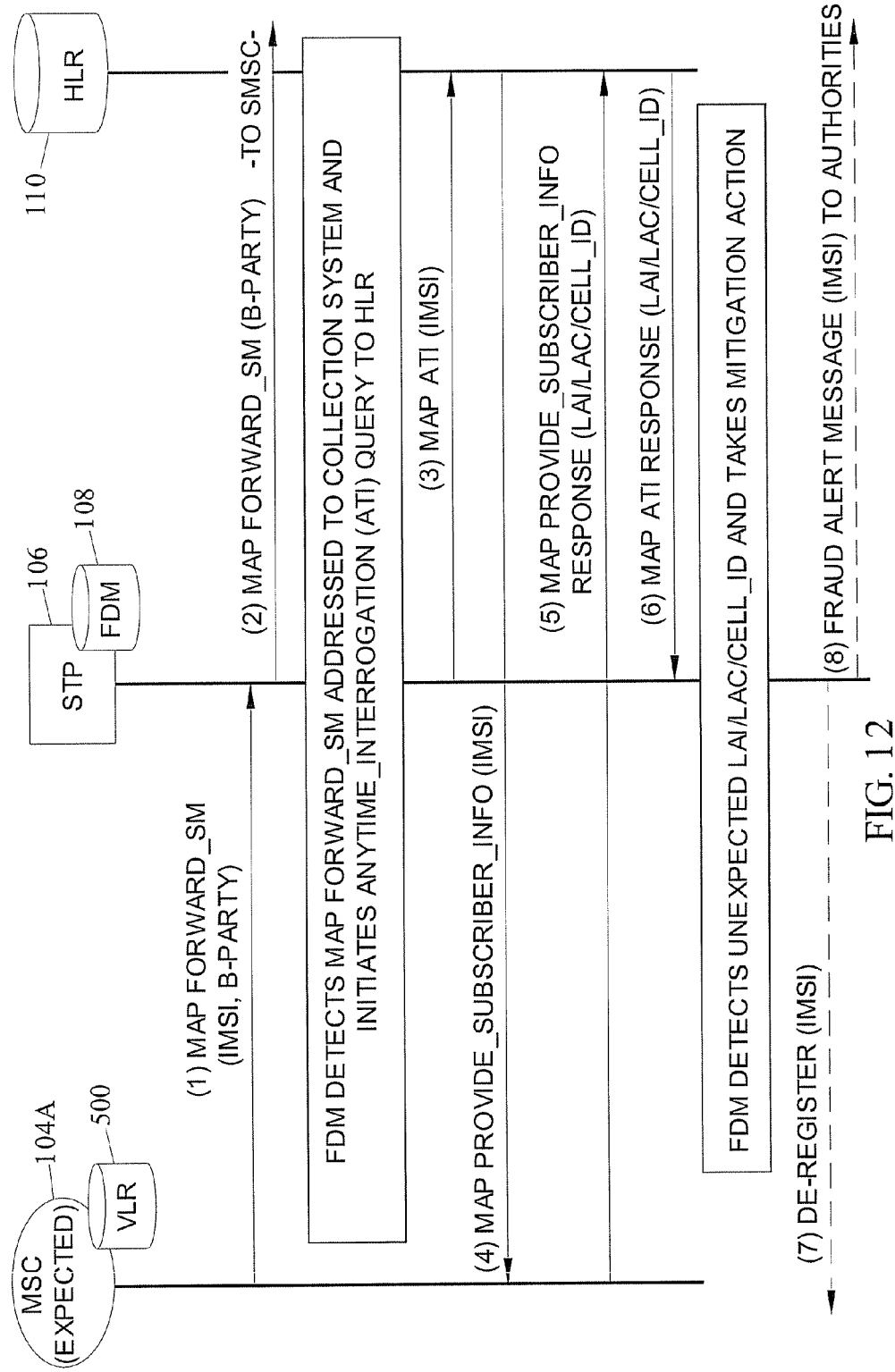
FIG. 12 is a message flow diagram illustrating screening of message service messages and querying of a home location register (HLR) by a fraud detection module according to an embodiment of subject matter described herein.

FIG. 12 is a message flow diagram illustrating screening of message service messages and querying of a home location register (HLR) by a fraud detection module according to an embodiment of subject matter described herein. In the embodiment illustrated in FIG. 12, a GSM-based network (e.g., GSM 100) is depicted where FDM 108 is operatively associated with STP 106.

In step 1, a MSC 104A associated with a communications device communicatively coupled to a fixed-location management system (e.g., a device 112) may launch a MAP Forward-ShortMessage (ForwardSM) message associated with the device. The ForwardSM message may include a sending device identifier or A-party identifier (e.g., ISMI, MSISDN, URI, IP address, etc.) and a destination identifier or B-party identifier. The ForwardSM message may be transmitted to STP 106. FDM 108 associated with STP 106 may receive or intercept the ForwardSM message. FDM 108 retrieves the A-party identifier and/or B-party identifier values contained in the ForwardSM message. FDM 108 may use the A-party identifier and/or B-party identifier values in determining whether the device should be screened based on location information (e.g., whether the device is a wireless communication device that is associated with a fixed-location management system). For example, FDM 108 may use device ID as a lookup value in a table accessible by or stored at FDM 108 (e.g., the table FIG. 2). For example, FDM 108 may check the A-party identifier contained in the message to determine if the device is provisioned in FDM 108 and may also check the B-party identifier contained in the message to determine whether the B-party identifier is an expected destination associated with the device in provisioned in FDM 108. FDM 108 may use data similar to the exemplary data shown in FIG. 14.

In step 2, in response to a determination that the communications device is not a device for screening by FDM 108, STP 106 may send the ForwardSM message towards an SMSC for further routing. In response to a determination that the communications device is a device for screening by FDM 108, FDM 108 may generate and initiate a MAP AnytimeInterrogation (ATI) query message towards HLR 110 requesting current location information for the subscriber. In step 3, FDM 106 (or STP 106) may send the ATI query message to HLR 110. In step 4, HLR 110 may send a MAP ProvideSubscriberInformation message to VLR 500 requesting current location information for the subscriber. In step 5, VLR 500 may send the response message with location information to HLR 110. In step 6, HLR 110 may respond with current location information for the subscriber. FDM 106 may compare the subscriber location information received from HLR 110 with the expected subscriber location information stored at FDM 106. If the location information does not match, a mitigation action may be triggered. For example, in step 7, STP 106 sends a deregister message to MSC 104A and, in step 8, STP 106 sends a fraud alert message containing one or more identifying parameters (e.g., the device ID) to one or more authorities.

Figure 13:
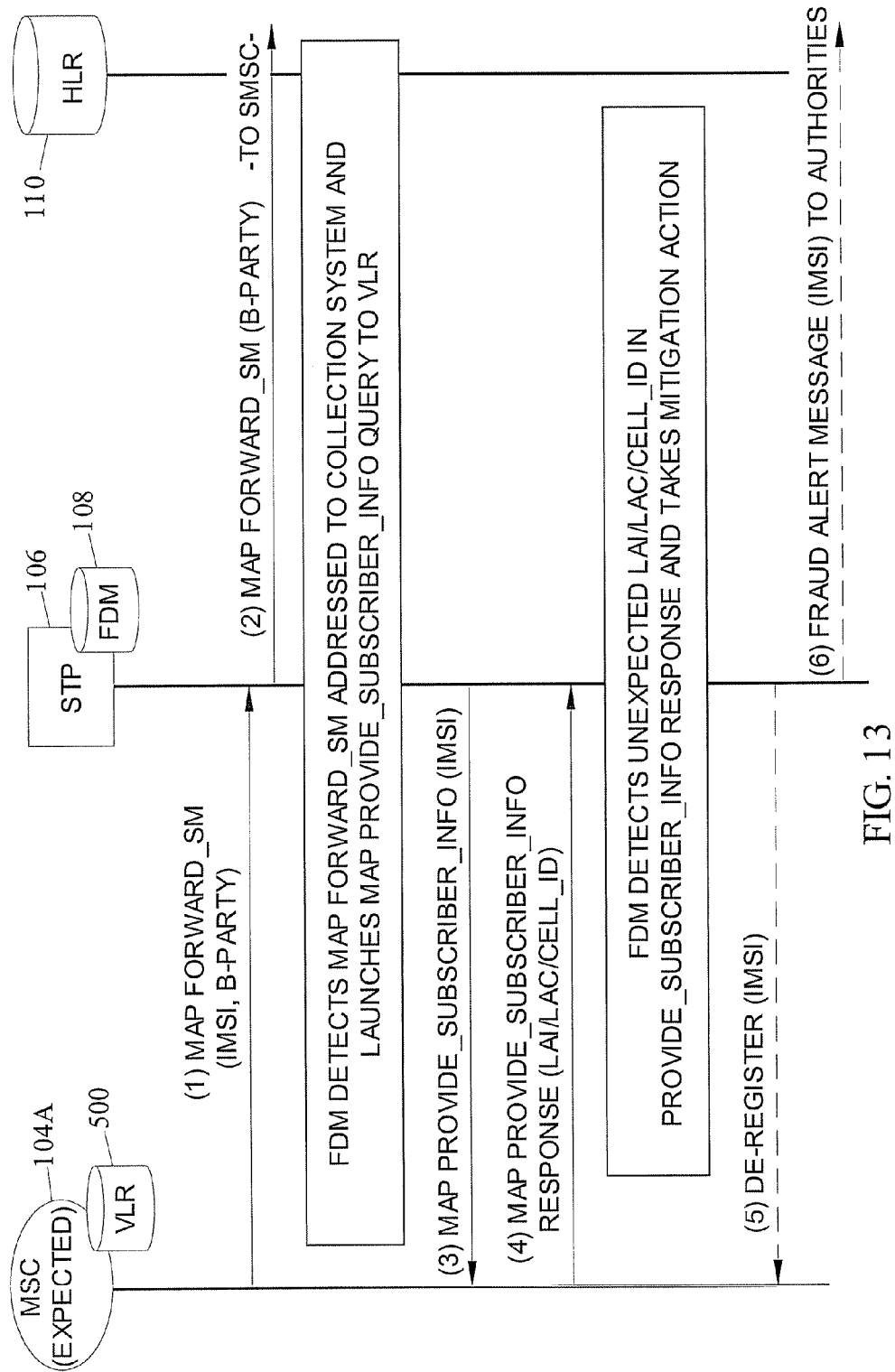
FIG. 13 is a message flow diagram illustrating screening of message service messages and querying of a visitor location register (VLR) by a fraud detection module according to an embodiment of subject matter described herein.

FIG. 13 is a message flow diagram illustrating screening of message service messages and querying of a visitor location register (VLR) by a fraud detection module according to an embodiment of subject matter described herein.

In step 1, a MSC 104A associated with a communications device communicatively coupled to a fixed-location management system (e.g., a device 112) may launch a MAP Forward-ShortMessage (ForwardSM) message associated with the device. The ForwardSM message may include a sending device identifier or A-party identifier (e.g., ISMI, MSISDN, URI, IP address, etc.) and a destination identifier or B-party identifier. The ForwardSM message may be transmitted to STP 106. FDM 108 associated with STP 106 may receive or intercept the ForwardSM message. FDM 108 retrieves the A-party identifier and/or B-party identifier values contained in the ForwardSM message. FDM 108 may use the A-party identifier and/or B-party identifier values in determining whether the device should be screened based on location information (e.g., whether the device is a wireless communication device that is associated with a fixed-location management system). For example, FDM 108 may use device ID as a lookup value in a table accessible by or stored at FDM 108 (e.g., the table FIG. 2). For example, FDM 108 may check the A-party identifier contained in the message to determine if the device is provisioned in FDM 108 and may also check the B-party identifier contained in the message to determine whether the B-party identifier is an expected destination associated with the device in provisioned in FDM 108. FDM 108 may use data similar to the exemplary data shown in FIG. 14.

In step 2, in response to a determination that the communications device is not a device for screening by FDM 108, STP 106 may send the ForwardSM message towards an SMSC for further routing. In response to a determination that the communications device is a device for screening by FDM 108, FDM 108 may generate and initiate a MAP ProvideSubscriberLocation query for requesting current location estimate information for the subscriber. In step 3, FDM 106 (or STP 106) may send the message towards the serving MSC 104A (and/or VLR 500) to HLR 110. In step 4, VLR 500 may send a response message with location information to STP 106 (and/or FDM 108). FDM 106 may compare the subscriber location information received from VLR 500 with the expected subscriber location information stored at FDM 106. If the location information does not match, a mitigation action may be triggered. For example, in step 5, STP 106 may send a deregister message to MSC 104A and, in step 6, STP 106 may send a fraud alert message containing one or more identifying parameters (e.g., the device ID) to one or more authorities.

FIG. 14 is a diagram illustrating an exemplary table for storing message rate threshold information usable by a fraud detection module according to an embodiment of subject matter described herein. In particular, FIG. 14 depicts a table 1400 that includes exemplary data that may be accessed and/or stored by an FDM module in a GSM network-based embodiment. Table 1400 includes an application destination ID field and an authorized device ID field. These fields may include mobile network subscriber or device identifiers, such as an IMSI, a MSISDN identifier, a short code, a URI, and a MIN. Authorized devices may be determined by resource or service providers (e.g., an electric company or wireless network operator) and may include one or more wireless communication devices associated with fixed-location management systems (e.g., fixed-location smart meters). Destinations or targets may also be determined by resource or service providers (e.g., an electric company or wireless network operator) and may include one or more collection or management centers for receiving information from wireless communication devices associated with fixed-location management systems.

Table 1400 may also include additional fields for storing message rate-related information. In one embodiment, one or more authorized device ID values may be associated with last update time and date fields. Such fields may indicate when an authorized device received or transmitted information to a particular destination. In one embodiment, time stamp information may be used for determining an average messaging rate for the mobile device. Table 1400 may also include an authorized or expected message rate field. The rate field may include information for determining an acceptable (e.g., maximum, average, or minimum) rate of messages received by and/or transmitted to authorized device. Rate field values may use various representations (e.g., ratios, fractions, symbols, and numbers). In one embodiment, an FDM may use rate field to determine whether a threshold message rate has been exceeded.

It will be appreciated that the information stored, accessed, or used by an FDM may vary depending on the communications network, configuration, and detection policies used. For example, an FMD deployed in other networks (e.g., SIP, IMS, WiMAX, DIAMETER, etc.) may store, access, or use different and/or additional information from that shown in FIG. 14. In a particular example, an exemplary table for storing message rate threshold information in a DIAMETER-based network may include user agent client (UAC) identifiers, such as a SIP uniform resource identifier (URI), Instant Message Service address, or an IP address.

Figure 15:
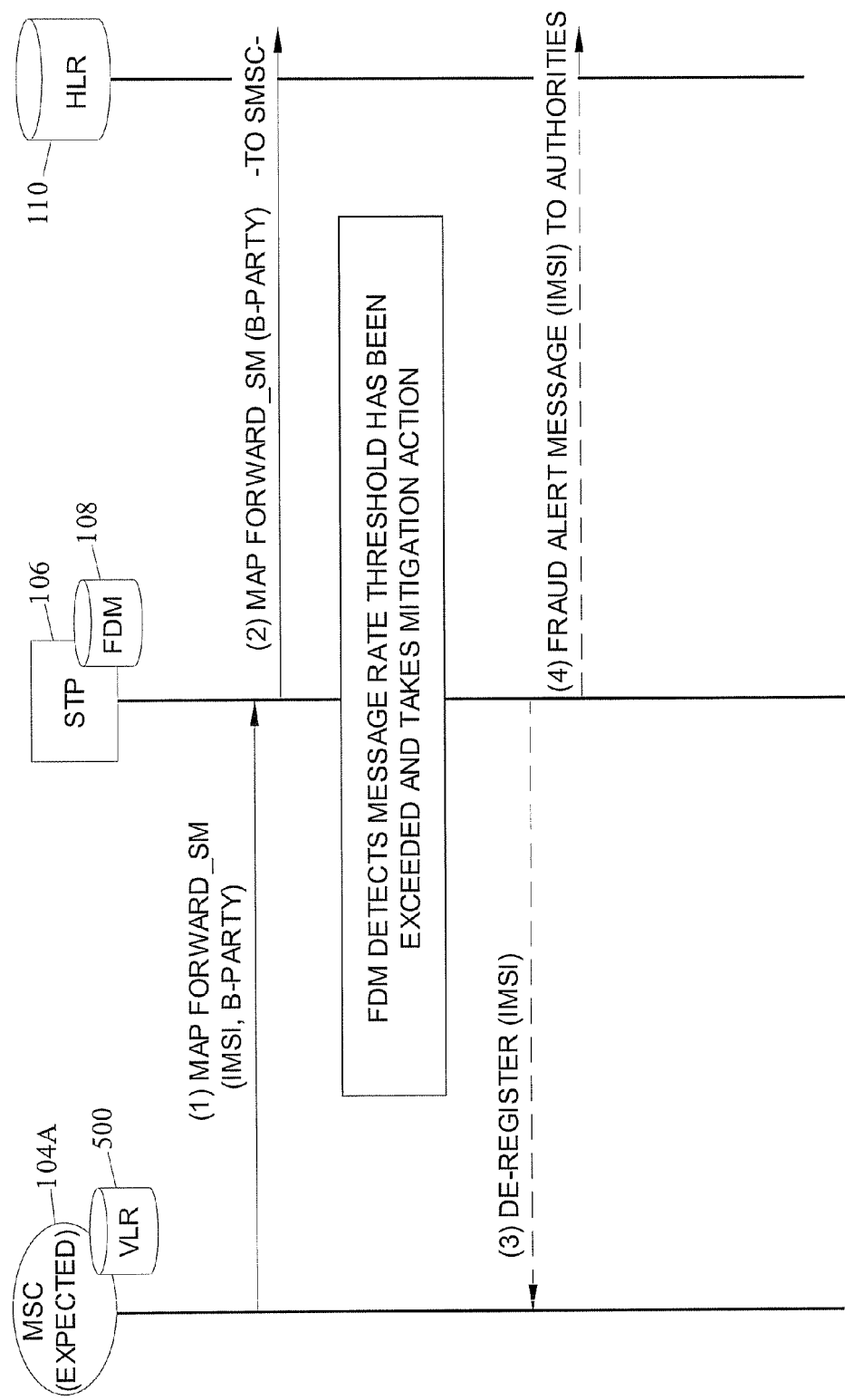
FIG. 15 is a message flow diagram illustrating screening of messages by a fraud detection module for determining whether a message rate threshold has been exceeded according to another embodiment of subject matter described herein.

FIG. 15 is a message flow diagram illustrating screening of messages by a fraud detection module for determining whether a message rate threshold has been exceeded according to another embodiment of subject matter described herein.

In step 1, a MSC 104A associated with a communications device communicatively coupled to a fixed-location management system (e.g., a device 112) may launch a MAP ForwardShortMessage (ForwardSM) message associated with the device. The ForwardSM message may include a sending device identifier or A-party identifier (e.g., ISMI, MSISDN, URI, IP address, etc.) and a target or destination identifier or B-party identifier. The ForwardSM message may be transmitted to STP 106. FDM 108 associated with STP 106 may receive or intercept the ForwardSM message. FDM 108 retrieves the A-party identifier and/or B-party identifier values contained in the ForwardSM message. FDM 108 may use the A-party identifier and/or B-party identifier values in determining whether the device should be screened based on location information (e.g., whether the device is a wireless communication device that is associated with a fixed-location management system). For example, FDM 108 may use device ID as a lookup value in a table accessible by or stored at FDM 108 (e.g., the table FIG. 2). For example, FDM 108 may check the A-party identifier contained in the message to determine if the device is provisioned in FDM 108 and may also check the B-party identifier contained in the message to determine whether the B-party identifier is an expected destination associated with the device in provisioned in FDM 108. FDM 108 may use data similar to the exemplary data shown in FIG. 14.

In step 2, in response to a determination that the communications device is not a device for screening by FDM 108, STP 106 may send the ForwardSM message towards an SMSC for further routing. In response to a determination that the communications device, is a device for screening by FDM 108, FDM 106 may determine whether an acceptable (e.g., maximum, minimum, or average) message rate threshold has been maintained for the communications device. For example, FDM 106 may determine that a maximum message reporting rate associated with the communications device has been exceeded or FDM 106 may determine that the current message rate associated with the communications device is below a minimum or average rate threshold. In one embodiment, FDM 106 may record and/or maintain time stamp information (e.g., in Table 1400) for relevant signaling message (e.g., the received ForwardSM to the target application) so that an average messaging rate may be computed for the communications device.

In one embodiment, in response to a determination that an accepted threshold has not been maintained (e.g., maximum threshold is exceeded), a mitigation action may be triggered. For example, in step 5, STP 106 may send a deregister message to MSC 104A and, in step 6, STP 106 may send a fraud alert message containing one or more identifying parameters (e.g., the device ID) to one or more authorities.

In a second embodiment, in response to a determination that an accepted threshold has not been maintained (e.g., maximum threshold is exceeded), FDM 106 may retrieve location information associated with the communication device (e.g., from the ForwardSM message and/or a mobility management element) and compare the retrieved location information with corresponding expected subscriber location information (e.g., information stored in Table 1400). If the location information does not match, a mitigation action may be triggered. For example, in step 3, STP 106 may send a deregister message to MSC 104A and, in step 4, STP 106 may send a fraud alert message containing one or more identifying parameters (e.g., the device ID) to one or more authorities.

Figure 16:
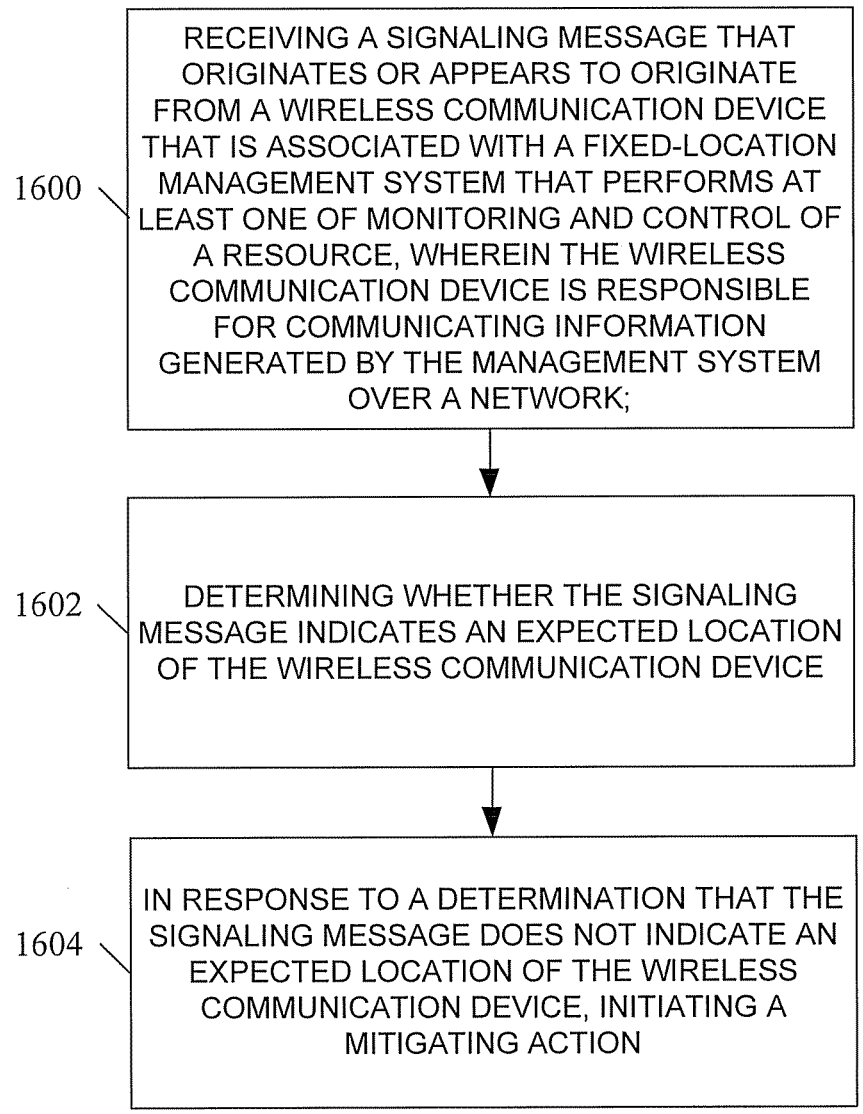
FIG. 16 is a flow chart illustrating exemplary steps for detecting and mitigating fraud in a distributed monitoring system which includes fixed-location monitoring and communication devices according to an embodiment of the subject matter described herein.

FIG. 16 is a flow chart illustrating exemplary steps for detecting and mitigating fraud in a distributed monitoring system which includes fixed-location monitoring and communication devices according to an embodiment of the subject matter described herein. Referring to the embodiment illustrated in FIG. 16, one or more steps, or portions therein, may be performed at a network element that includes or is operatively associated with a FDM. Additionally, one or more steps, or portions therein, may be performed at the FDM.

At block 1600, a signaling message that originates or appears to originate from a wireless communication device that is associated with a fixed-location management system that performs at least one of monitoring and control of a resource is received. The wireless communication device is responsible for communicating information generated by the management system over a network. For example, in FIG. 1, a FDM 108 may intercept or receive a signaling message associated with device 112 sent through an STP 106.

At block 1602, it is determined whether the signaling message indicates an expected location of the wireless communication device. For example, FDM 106 may determine whether the signaling message indicates that device 112 is in an expected location by retrieving location information associated with the wireless communication device and comparing the location information with corresponding expected location information found in table 200. In one embodiment, retrieving location information may include retrieving values derived from one or more parameters in the signaling message. Retrieving location information may also include generating and sending one or more signaling messages (e.g., to a mobility management element) for receiving additional location information.

At block 1604, in response to a determination that the signaling message does not indicate an expected location of the wireless communication device, a mitigating action may be initiated. For example, FDM 106 may alert a network operator and may initiate a procedure to deregister device 112 from the network.

Figure 17:
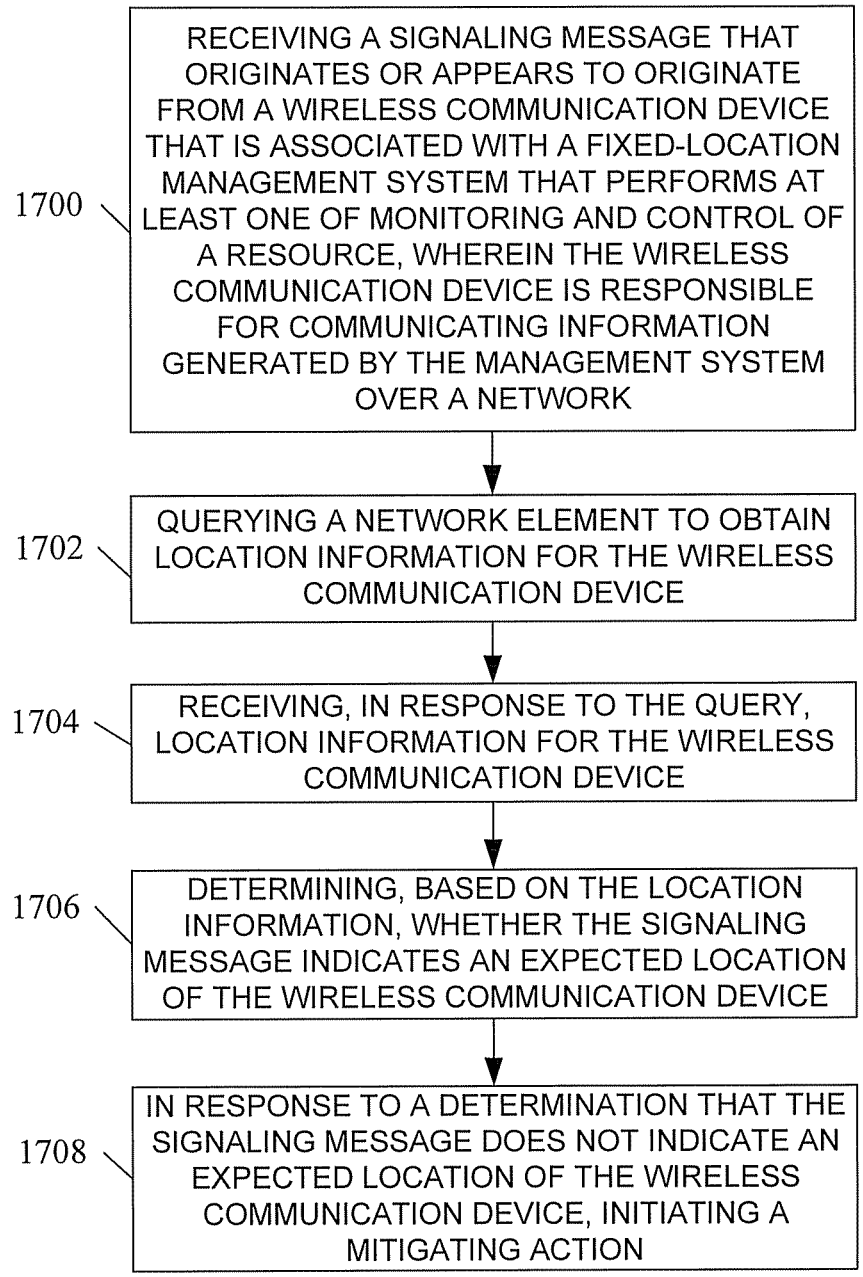
FIG. 17 is a flow chart illustrating exemplary steps for detecting and mitigating fraud in a distributed monitoring system which includes fixed-location monitoring and communication devices according to another embodiment of the subject matter described herein.

FIG. 17 is a flow chart illustrating exemplary steps for detecting and mitigating fraud in a distributed monitoring system which includes fixed-location monitoring and communication devices according to another embodiment of the subject matter described herein. Referring to the embodiment illustrated in FIG. 17, one or more steps, or portions therein, may be performed at a network element that includes or is operatively associated with a FDM. Additionally, one or more steps, or portions therein, may be performed at the FDM.

At block 1700, a signaling message that originates or appears to originate from a wireless communication device that is associated with a fixed-location management system that performs at least one of monitoring and control of a resource is received. The wireless communication device is responsible for communicating information generated by the management system over a network. For example, in FIG. 1, a FDM 108 may intercept or receive a signaling message associated with device 112 sent through an STP 106.

At block 1702, a network element is queried to obtain location information for the wireless communication device. For example, FDM 108 may request location information for device 112 from a mobility management element, such as an HLR 110 or VLR 110.

At block 1704, in response to the query, location information is received for the wireless communication device. For example, after receiving a location request, HLR 110 may contact additional network elements for retrieving current location information and may send a response message to FDM 108 with the retrieved location information.

At block 1602, it is determined, based on the location information, whether the signaling message indicates an expected location of the wireless communication device. For example, FDM 106 may determine whether the signaling message indicates that device 112 is in an expected location by comparing the retrieved location information with corresponding expected location information found in table 200.

At block 1704, in response to a determination that the signaling message does not indicate an expected location of the wireless communication device, a mitigating action may be initiated. For example, FDM 106 may alert a network operator and may initiate a procedure to deregister device 112 from the network.

Figure 18:
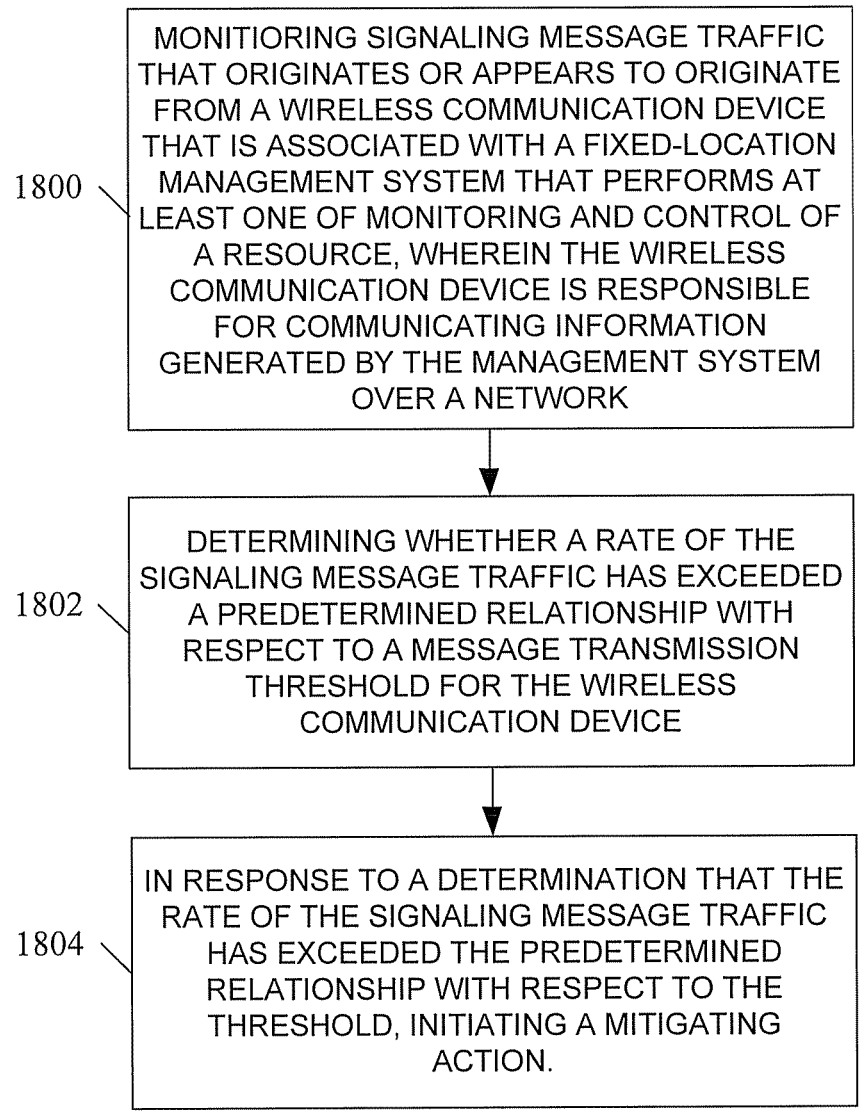
FIG. 18 is a flow chart illustrating exemplary steps for detecting and mitigating fraud by monitoring traffic rates in a distributed monitoring system which includes fixed-location monitoring and communication devices according to an embodiment of the subject matter described herein.

FIG. 18 is a flow chart illustrating exemplary steps for detecting and mitigating fraud by monitoring traffic rates in a distributed monitoring system which includes fixed-location monitoring and communication devices according to an embodiment of the subject matter described herein. Referring to the embodiment illustrated in FIG. 18, one or more steps, or portions therein, may be performed at a network element that includes or is operatively associated with a FDM. Additionally, one or more steps, or portions therein, may be performed at the FDM.

At block 1800, signaling message traffic that originates or appears to originate from a wireless communication device that is associated with a fixed-location management system that performs at least one of monitoring and control of a resource is monitored. The wireless communication device is responsible for communicating information generated by the management system over a network. For example, signaling traffic from a wireless communication device 112 associated with a smart utility meter may be monitored.

At block 1802, it is determined whether a rate of the signaling message traffic has exceeded a predetermined relationship with respect to a message transmission threshold for the wireless communication device. For example, FDM 106 may determine that device 112 has exceeded its specified message threshold as specified in table 1400.

At block 1804, in response to a determination that the rate of the signaling message traffic has exceeded the predetermined relationship with respect to the threshold, a mitigating action may be initiated. For example, FDM 106 may alert a network operator and may throttle or reject subsequent traffic from device 112.

Figure 19:
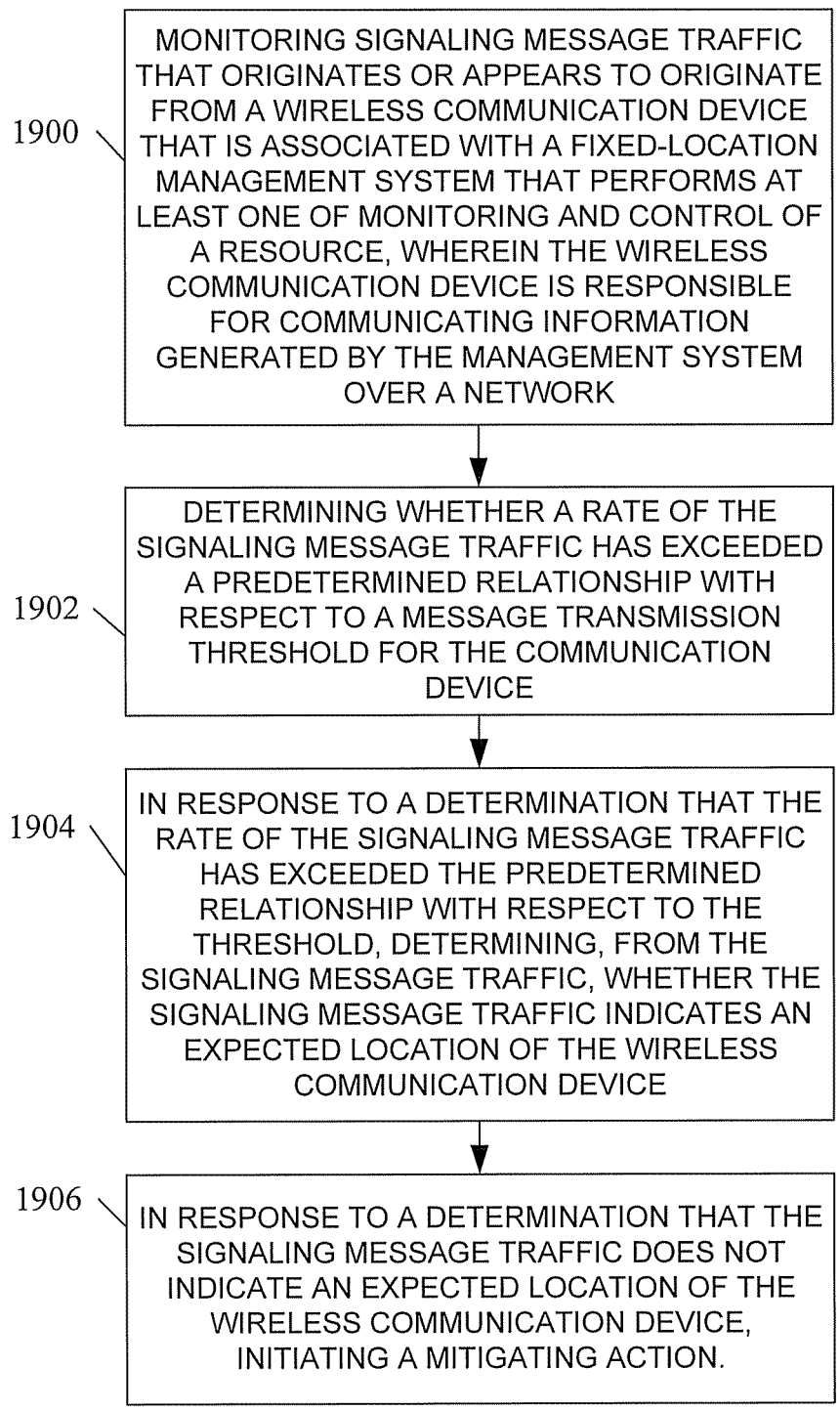
FIG. 19 is a flow chart illustrating exemplary steps for detecting and mitigating fraud by monitoring traffic rates in a distributed monitoring system which includes fixed-location monitoring and communication devices according to another embodiment of the subject matter described herein.

FIG. 19 is a flow chart illustrating exemplary steps for detecting and mitigating fraud by monitoring traffic rates in a distributed monitoring system which includes fixed-location monitoring and communication devices according to another embodiment of the subject matter described herein. Referring to the embodiment illustrated in FIG. 19, one or more steps, or portions therein, may be performed at a network element that includes or is operatively associated with a FDM. Additionally, one or more steps, or portions therein, may be performed at the FDM.

At block 1900, signaling message traffic that originates or appears to originate from a wireless communication device that is associated with a fixed-location management system that performs at least one of monitoring and control of a resource is monitored. The wireless communication device is responsible for communicating information generated by the management system over a network. For example, signaling traffic from a wireless communication device 112 associated with a smart utility meter may be monitored.

At block 1902, it is determined whether a rate of the signaling message traffic has exceeded a predetermined relationship with respect to a message transmission threshold for the wireless communication device. For example, FDM 106 may determine that device 112 has exceeded its specified message threshold as specified in table 1400.

At block 1904, in response to a determination that the rate of the signaling message traffic has exceeded the predetermined relationship with respect to the threshold, it is determined, from the signaling message traffic, whether the signaling message traffic indicates an expected location of the wireless communication device a mitigating action may be initiated. For example, FDM 106 may determine a message rate for device 112 has been exceeded. In this example, FDM 106 may then determine whether signaling traffic indicates that device 112 is in an expected location.

At block 1906, in response to a determination that the signaling message traffic does not indicate an expected location of the wireless communication device, initiating a mitigating action. For example, FDM 106 may alert a network operator and may initiate a procedure to deregister device 112 from the network.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for detecting and mitigating fraud in a distributed monitoring system which includes fixed-location monitoring and communication devices, the method comprising:
receiving a signaling message that originates or appears to originate from a wireless communication device that is associated with a fixed-location smart meter that performs at least one of monitoring and control of a resource, wherein the wireless communication device is responsible for communicating information generated by the smart meter over a network;
determining whether the signaling message indicates an expected location of the wireless communication device, wherein determining whether the signaling message indicates an expected location of the wireless communication device comprises retrieving location information associated with the wireless communication device and comparing the location information with corresponding expected location information, wherein the corresponding expected location information is provisioned by a network operator or a service provider; and
in response to a determination that the signaling message does not indicate an expected location of the wireless communication device, initiating a mitigating action.

2. The method of claim 1 wherein the mitigating action includes one of blocking the message, generating an alert message, initiating de-registration of the wireless communication device, alerting an entity, and blocking all subsequent signaling messages sent by the wireless communication device.

3. The method of claim 1 wherein the signaling message is at least one of a mobility management message, a mobile application part (MAP) message, a MAP UpdateLocation message, a MAP UpdateLocationArea message, a MAP ProvideSubscriberInformation message, a MAP ProvideSubscriberLocation message, a DIAMETER message, a session initiation protocol (SIP) message, a message service message, a short message service (SMS), a multimedia message service (MMS), an Internet protocol (IP) message, a MAP ForwardShortMessage message, a DIAMETER Location Information Request (LIR) message, a DIAMETER Server Assignment Request (SAR) message, a general packet radio service (GPRS) message, a MAP GPRS analogs message, an unstructured supplementary data service (USSD) message, a SIP INFO message, and an instant message (IM).

4. The method of claim 1 wherein the network includes at least one of an signaling system number 7 (SS7) network, an Internet protocol (IP) network, an IP multimedia subsystem (IMS) network, a long term evolution (LTE) network, a DIAMETER network, a global system for mobile communications (GSM) network, a WiMAX network, general packet radio service (GPRS) network, and an IS-41 network.

5. The method of claim 1 wherein retrieving location information associated with the wireless communication device includes retrieving location information from one or more parameters in the signaling message.

6. The method of claim 1 wherein retrieving location information associated with the wireless communication device includes generating and sending one or more signaling messages for receiving additional location information.

7. The method of claim 1 wherein determining whether the signaling message indicates an expected location of the wireless communication device is performed at a fraud detection module and the expected location information is stored in a table accessibly by the fraud detection module.

8. The method of claim 5 wherein the fraud detection module is operatively associated with a network element located in the network.

9. The method of claim 7 wherein the network element includes at least one of a network routing element, a signaling system number 7 (SS7) signal transfer point (STP), an Internet protocol (IP) node, a SS7-IP signaling gateway, a session initiation protocol (SIP) node, a DIAMETER node, a WiMAX node, a base station, an long term evolution (LTE) node, a global system for mobile communications (GSM) node, a IS-41 node, a mobility management service element, a home location register (HLR), a visitor location register (VLR), a home subscriber server (HSS), or a user profile server function (UPSF), a SIP registrar, SIP location server, a call session control function (CSCF), a SIP proxy, a DIAMETER server, an AAA server, an application services network (ASN) gateway, an external probe, and a fraud detection node.

10. A method for detecting and mitigating fraud in a distributed monitoring system which includes fixed-location monitoring and communication devices, the method comprising:
receiving a signaling message that originates or appears to originate from a wireless communication device that is associated with a fixed-location smart meter that performs at least one of monitoring and control of a resource, wherein the wireless communication device is responsible for communicating information generated by the smart meter over a network;

querying a network element to obtain location information for the wireless communication device;

receiving, in response to the query, location information for the wireless communication device;

determining, based on the location information, whether the signaling message indicates an expected location of the wireless communication device, wherein determining whether the signaling message indicates an expected location of the wireless communication device comprises comparing the location information with corresponding expected location information, wherein the corresponding expected location information is provisioned by a network operator or a service provider; and in response to a determination that the signaling message does not indicate an expected location of the wireless communication device, initiating a mitigating action.

11. The method of claim 10 wherein the network element includes at least one of a mobility management service element, a home location register (HLR), a visitor location register (VLR), a home subscriber server (HSS), a base station, a user profile server function (UPSF), a SIP registrar, SIP location server, a call session control function (CSCF), a SIP proxy, a DIAMETER server, an AAA server, an external probe, an application services network (ASN) gateway, and a fraud detection node.

12. A system for detecting and mitigating fraud in a distributed monitoring system that includes fixed location monitoring and communication devices, the system comprising:

a network node for receiving a signaling message that originates or appears to originate from a wireless communication device that is associated with a fixed location smart meter that monitors usage of a resource, wherein the wireless communication device is responsible for communicating usage information generated by the smart meter over a network; and a fraud detection module operatively associated with the network node for determining whether the signaling message indicates an expected location of the wireless communication device, wherein determining whether the signaling message indicates an expected location of the wireless communication device comprises retrieving location information associated with the wireless communication device and comparing the location information with corresponding expected location information, wherein the corresponding expected location information is provisioned by a network operator or a service provider, and, in response to a determination that the signaling message does not indicate an expected location of the wireless communication device, initiating a mitigating action.

13. The system of claim 12 wherein the network node includes at least one of a network routing element, a signaling system number 7 (SS7) signal transfer point (STP), an Internet protocol (IP) node, a SS7-IP signaling gateway, a session initiation protocol (SIP) node, a DIAMETER node, a WiMAX node, a base station, an long term evolution (LTE) node, a global system for mobile communications (GSM) node, a IS-41 node, a mobility management service element, a home location register (HLR), a visitor location register (VLR), a home subscriber server (HSS), or a user profile server function (UPSF), a SIP registrar, SIP location server, a call session control function (CSCF), a SIP proxy, a DIAMETER server, an AAA server, an application services network (ASN) gateway, an external probe, and a fraud detection node.

14. The system of claim 12 wherein the signaling message is at least one of a mobility management message, a mobile application part (MAP) message, a MAP UpdateLocation message, a MAP UpdateLocationArea message, a MAP ProvideSubscriberInformation message, a MAP ProvideSubscriberLocation message, a DIAMETER message, a session initiation protocol (SIP) message, a message service message, a short message service (SMS), a multimedia message service (MMS), an Internet protocol (IP) message, a MAP ForwardShortMessage message, a DIAMETER Location Information Request (LIR) message, a DIAMETER Server Assignment Request (SAR) message, a general packet radio service (GPRS) message, a MAP GPRS analogs message, an unstructured supplementary data service (USSD) message, a SIP INFO message, and an instant message (IM).

15. The system of claim 12 wherein the network includes at least one of an signaling system number 7 (SS7) network, an Internet protocol (IP) network, an IP multimedia subsystem (IMS) network, a long term evolution (LTE) network, a DIAMETER network, a global system for mobile communications (GSM) network, a WiMAX network, general packet radio service (GPRS) network, and an IS-41 network.

16. The system of claim 12 wherein retrieving location information associated with the wireless communication device includes retrieving location information from one or more parameters in the signaling message.

17. The system of claim 12 wherein retrieving location information associated with the wireless communication device includes generating and sending one or more signaling messages for receiving additional location information.

18. A non-transitory computer readable medium having stored thereon executable instructions that when executed by the processor of a computer control the computer to perform steps comprising:

receiving a signaling message that originates or appears to originate from a wireless communication device that is associated with a fixed-location smart meter that performs at least one of monitoring and control of a resource, wherein the wireless communication device is responsible for communicating information generated by the smart meter over a network;

determining whether the signaling message indicates an expected location of the wireless communication device, wherein determining whether the signaling message indicates an expected location of the wireless communication device comprises retrieving location information associated with the wireless communication device and comparing the location information with corresponding expected location information, wherein the corresponding expected location information is provisioned by a network operator or a service provider; and in response to a determination that the signaling message does not indicate an expected location of the wireless communication device, initiating a mitigating action.

* * * * *